United States Patent
Sharma et al.

(10) Patent No.: US 11,539,864 B1
(45) Date of Patent: Dec. 27, 2022

(54) FOLDED OPTICS CAMERA AND ACTUATOR ASSEMBLY

(71) Applicant: Apple Inc., Cupertino, CA (US)

(72) Inventors: Shashank Sharma, San Francisco, CA (US); Brad V. Johnson, Santa Clara, CA (US); Alfred N. Mireault, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 16/563,725

(22) Filed: Sep. 6, 2019

Related U.S. Application Data

(60) Provisional application No. 62/729,381, filed on Sep. 10, 2018.

(51) Int. Cl.
*H04N 5/225* (2006.01)
*G03B 17/12* (2021.01)
*G02B 13/00* (2006.01)

(52) U.S. Cl.
CPC ....... *H04N 5/2252* (2013.01); *G02B 13/0075* (2013.01); *G03B 17/12* (2013.01); *H04N 5/2257* (2013.01)

(58) Field of Classification Search
CPC .. H04N 5/2252; H04N 5/2257; H04N 5/2254; H04N 5/23287; G02B 13/0075; G03B 17/12; G03B 2205/0069; G03B 5/04; G03B 5/02; G03B 5/06; G03B 5/08; G03B 5/00; H02K 41/0356; H04M 1/0264

See application file for complete search history.

(56) References Cited

U.S. PATENT DOCUMENTS

| | | | |
|---|---|---|---|
| 9,256,047 B2 | 2/2016 | Takano | |
| 9,549,107 B2 | 1/2017 | Georgiev | |
| 9,927,600 B2 | 3/2018 | Goldenberg et al. | |
| 2010/0002317 A1* | 1/2010 | Osaka | G02B 7/08 359/824 |
| 2012/0249815 A1* | 10/2012 | Bohn | H04N 5/23232 348/208.99 |
| 2012/0314307 A1* | 12/2012 | Ikushima | G02B 27/646 359/814 |
| 2013/0021485 A1* | 1/2013 | Hsu | G02B 27/64 348/208.99 |
| 2017/0347033 A1* | 11/2017 | Miller | G02B 27/646 |
| 2018/0031854 A1* | 2/2018 | Hu | G03B 29/00 |
| 2018/0120674 A1* | 5/2018 | Avivi | G02B 27/64 |
| 2019/0204531 A1* | 7/2019 | Sugawara | G03B 5/06 |
| 2019/0227199 A1* | 7/2019 | Kao | G02B 7/023 |
| 2020/0241314 A1* | 7/2020 | Takimoto | H04N 5/23287 |
| 2021/0058537 A1* | 2/2021 | Saito | G02B 13/0065 |
| 2021/0136261 A1* | 5/2021 | Lee | G03B 30/00 |

* cited by examiner

*Primary Examiner* — Sinh Tran
*Assistant Examiner* — Zhenzhen Wu
(74) *Attorney, Agent, or Firm* — Alexander A. Knapp; Kowert, Hood, Munyon, Rankin & Goetzel, P.C.

(57) ABSTRACT

Various embodiments include a camera with a folded optics arrangement and include a voice coil motor (VCM) actuator assembly to provide autofocus (AF) and/or optical image stabilization (OIS) movement. The camera with folded optics and the associated VCM actuator assembly have a first rotational normal mode of free vibration such that lenses of the camera rotate about an optical axis of the camera such that the rotational motion in the first rotational mode of free vibration is invisible from a perspective of an image sensor of the camera.

20 Claims, 16 Drawing Sheets

FOLDED OPTICS CAMERA AND ACTUATOR ASSEMBLY

PRIORITY CLAIM

This application claims benefit of priority to U.S. Provisional Application Ser. No. 62/729,381, entitled "Folded Optics Camera and Actuator Assembly", filed Sep. 10, 2018, and which is incorporated herein by reference in its entirety.

BACKGROUND

Technical Field

This disclosure relates generally to a folded optics arrangement camera and actuator assembly.

Description of the Related Art

The advent of small, mobile multipurpose devices such as smartphones and tablet or pad devices has resulted in a need for high-resolution, small form factor cameras for integration into such devices. Some small form factor cameras may incorporate optical image stabilization (OIS) mechanisms that may sense and react to external excitation/disturbance forces by adjusting a location of one or more optical lenses in one or more directions in an attempt to compensate for unwanted motion of the lenses. Some small form factor cameras may incorporate an autofocus (AF) mechanism whereby an object focal distance can be adjusted to focus an object plane in front of the camera at an image plane to be captured by an image sensor of the camera. In some such autofocus mechanisms, the optical lens or lenses are moved as a single rigid body along the optical axis of the camera to refocus the camera.

Figure 1:
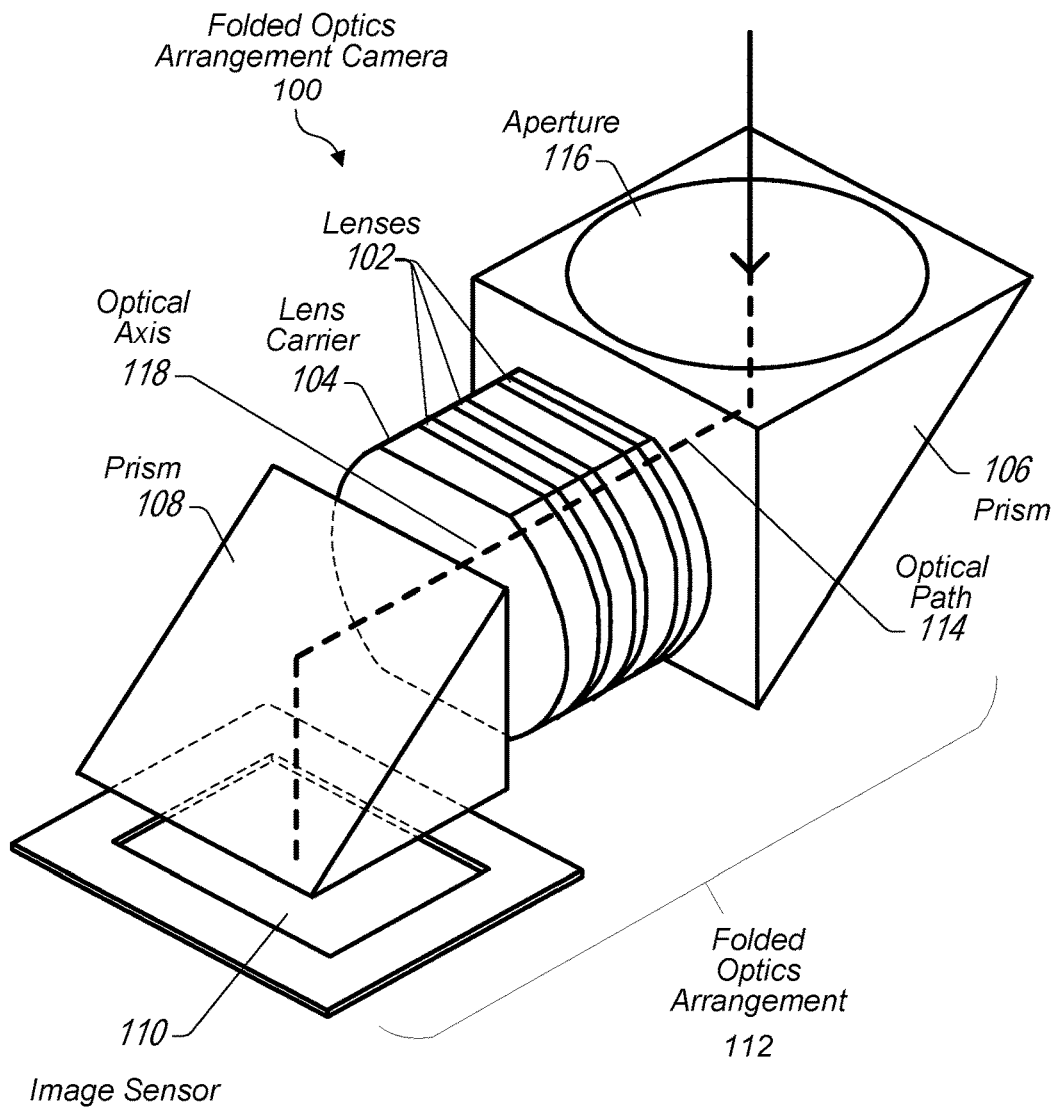
FIG. 1 illustrates a simplified view of a folded optics arrangement camera, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, voice coil motors, and suspension elements to improve effectiveness and stability of a miniature actuation mechanism for a compact camera module. More specifically, in some embodiments, a compact folded optics camera includes suspension elements and actuators to deliver functions such as autofocus (AF) and/or optical image stabilization (OIS). One approach to delivering a very compact actuator for AF and/or OIS is to use one or more voice coil motor (VCM) actuators. In some embodiments, one or more VCM actuators control movement of a lens carrier within a carrier frame of a folded optics arrangement camera to perform AF adjustments. Also, in some embodiments, one or more VCM actuators control movement of a carrier frame of a folded optics arrangement camera (and lens carrier mounted within the carrier frame) to perform OIS adjustments. In some embodiments, suspension wires that mechanically connect a carrier frame to a static structure of a folded optics camera are mounted horizontally in the folded optics camera and run along a length of the carrier frame in a same direction as an optical axis of the folded optics camera. In some embodiments, suspension springs that mechanically connect a lens carrier to a carrier frame in which the lens carrier is mounted allow for movement of the lens carrier in a same direction as an optical axis of the folded optics camera, but prevent motion of the lens carrier relative to the carrier frame in directions orthogonal to the optical axis.

FIG. 1 illustrates a simplified view of a folded optics arrangement camera and shows how light is bent within the folded optics arrangement camera, according to some embodiments.

In some embodiments, any of the embodiments described in regard to FIGS. 2-16 may include one or multiple features, components, and/or functionality as described herein with regard to folded optics arrangement camera 100 illustrated in FIG. 1. For example, any of the folded optics arrangement cameras described in regard to FIGS. 2-16 may bend light in a similar manner as described for folded optics arrangement camera 100. Also, any of the embodiments described in regard to FIGS. 2-16 may include a lens carrier that is actuated in an autofocus (AF-X) direction and optical image stabilization (OIS-Y, OIS-Z) directions as described below for folded optics arrangement camera 100 illustrated in FIG. 1 and lens carrier 104 illustrated in FIG. 2.

In some embodiments, folded optics arrangement camera 100 may include a group of one or more lenses 102 mounted in a lens carrier 104, a first prism 106, a second prism 108, and an image sensor 110. In some embodiments, the lens carrier 104 may be located between the first prism 106 and the second prism 108, forming a folded optics arrangement 112. Light may enter folded optics arrangement camera 100 via an aperture 116 and follow an optical path 114 that is folded by the first prism 106 such that the light is directed towards the one or more lenses 102 of the lens carrier 104, passes through the one or more lenses 102, and is folded by the second prism 108 such that the light is directed towards the image sensor 110. As will be discussed in further detail below, the lens carrier 104 may be coupled with an actuator assembly that is configured to move the lens carrier 104 in multiple directions, e.g., to provide autofocus (AF) and/or optical image stabilization (OIS) functionality. Optical axis 118 may be defined as the portion of optical path 114 that runs between prism 106 and 108 through lenses 102.

Figure 2:
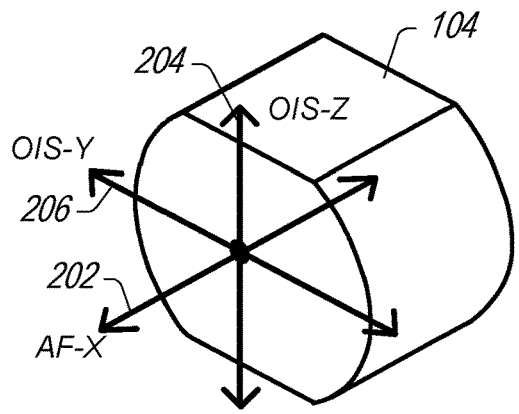
FIG. 2 illustrates movements of a lens carrier of a folded optics arrangement camera in an autofocus direction and multiple optical image stabilization directions, according to some embodiments.

FIG. 2 illustrates voice coil motor actuator movements of the lens carrier of the folded optics arrangement camera in an autofocus direction and multiple optical image stabilization directions, according to some embodiments.

FIG. 2 illustrates an example lens carrier (e.g., lens carrier 104) that moves in directions corresponding to at least three degrees of freedom, (e.g. along an X, Y, and Z axis) within a folded optics arrangement camera 100. In some embodiments, the lens carrier 104 may be combined in a folded optics arrangement camera that includes a voice coil motor actuator and horizontal suspension wires as described herein with reference to FIGS. 1 and 3-16.

As indicated in FIG. 2, the lens carrier 104 may be shifted (e.g., by an actuator, such as the actuator assemblies/arrangements discussed in further detail below) along optical axis 202 to provide AF movement in the X-direction. Additionally, or alternatively, the lens carrier 104 may be shifted along Z-axis 204 to provide OIS movement in OIS-Z directions (also referred to herein as "OIS-Z movement"). Additionally, or alternatively, the lens carrier 104 may be shifted along Y-axis 206 to provide OIS movement in OIS-Y directions (also referred to herein as "OIS-Y movement"), which are orthogonal to the OIS-X directions.

A folded optics arrangement camera that includes one or more actuators may have vibration characteristics resulting from an arrangement of masses and springs of the camera and actuators. In some situations, a folded optics arrangement camera that includes one or more actuators may have both translational and rotational modes of normal free vibration that may be excited at one or more resonant frequencies of the camera and actuator system (e.g. one or more natural frequencies of the system). In some situations, such normal modes of free vibration may, when excited, negatively impact image quality. For example, oscillating translational motion that causes a lens carrier to move towards and away from an image sensor may cause captured images to be out of focus. In a similar manner, rotational motion that causes a lens carrier to rotate such that the lens carrier is skewed in relation to light passing through the lens carrier along an optical axis of the camera may cause images to be negatively impacted. For example, one portion of the image may be slightly magnified or better focused than an opposing portion of the image.

However, in other situations normal modes of free vibration may be benign (e.g. not adversely impact image quality). For example, a normal mode of rotational free vibration that causes a lens carrier to rotate about an optical axis of a camera may not negatively affect a quality of a captured image. This is because the lenses of the lens carrier may be symmetrical such that rotation of the lenses does not affect how light is altered as the light passes through the lenses of the lens carrier on the way to the image sensor.

In some embodiments, a folded optics arrangement camera that includes actuators and suspension systems that make up an actuator assembly may include a lens carrier arranged in a carrier frame and connected to the carrier frame via suspension springs that allow motion of the lens carrier in the carrier frame along the optical axis. For example, a voice coil motor actuator may move the lens carrier in the carrier frame along the optical axis (e.g. in the X-direction) to perform autofocusing. However, the suspension springs connecting the lens carrier to the carrier frame may restrict motion of the lens carrier relative to the carrier frame in directions not along the optical axis. This may prevent the lens carrier from rotating in the carrier frame, or from being translated vertically (e.g. in the Z-direction) or horizontally (e.g. in the Y-direction) relative to the carrier frame.

In some embodiments, a folded optics arrangement camera and actuator assembly may further include horizontal suspension wires that connect the carrier frame to a static structure of the camera. For example, the static structure of the camera may be rigidly coupled to a frame or other member of a device in which the camera is mounted. The suspension wires may prevent motion of the carrier frame along the optical axis (e.g. in the X-direction), but may allow the carrier frame (and the lens carrier mounted within the carrier frame) to be adjusted in directions orthogonal to the optical axis (e.g. in the Z-direction and the Y-direction). For example, voice coil motor (VCM) actuators may adjust the carrier frame (and lens carrier mounted in the carrier frame) in an OIS-X direction and an OIS-Z direction to perform optical image stabilization.

In some embodiments, the mass of the carrier frame, the mass of the lens carrier, and respective spring constants of the suspension springs connecting the lens carrier to the carrier frame may result in a system that has a first mode of normal rotational free vibration such that the lens carrier rotates about the optical axis without tilting or skewing relative to the optical axis. This first mode of normal rotational free vibration may not negatively impact image quality. For example, the lenses of the lens carrier may rotate about the optical axis while remaining at a same distance and orientation relative to the image sensor. Additionally, such an arrangement of masses and springs may cause other modes of normal free rotational vibration to correspond to higher frequencies that are less likely to be excited. For example, a second and a third mode of normal rotational free vibration may be associated with natural frequencies of 200 Hertz or greater.

Figure 3:
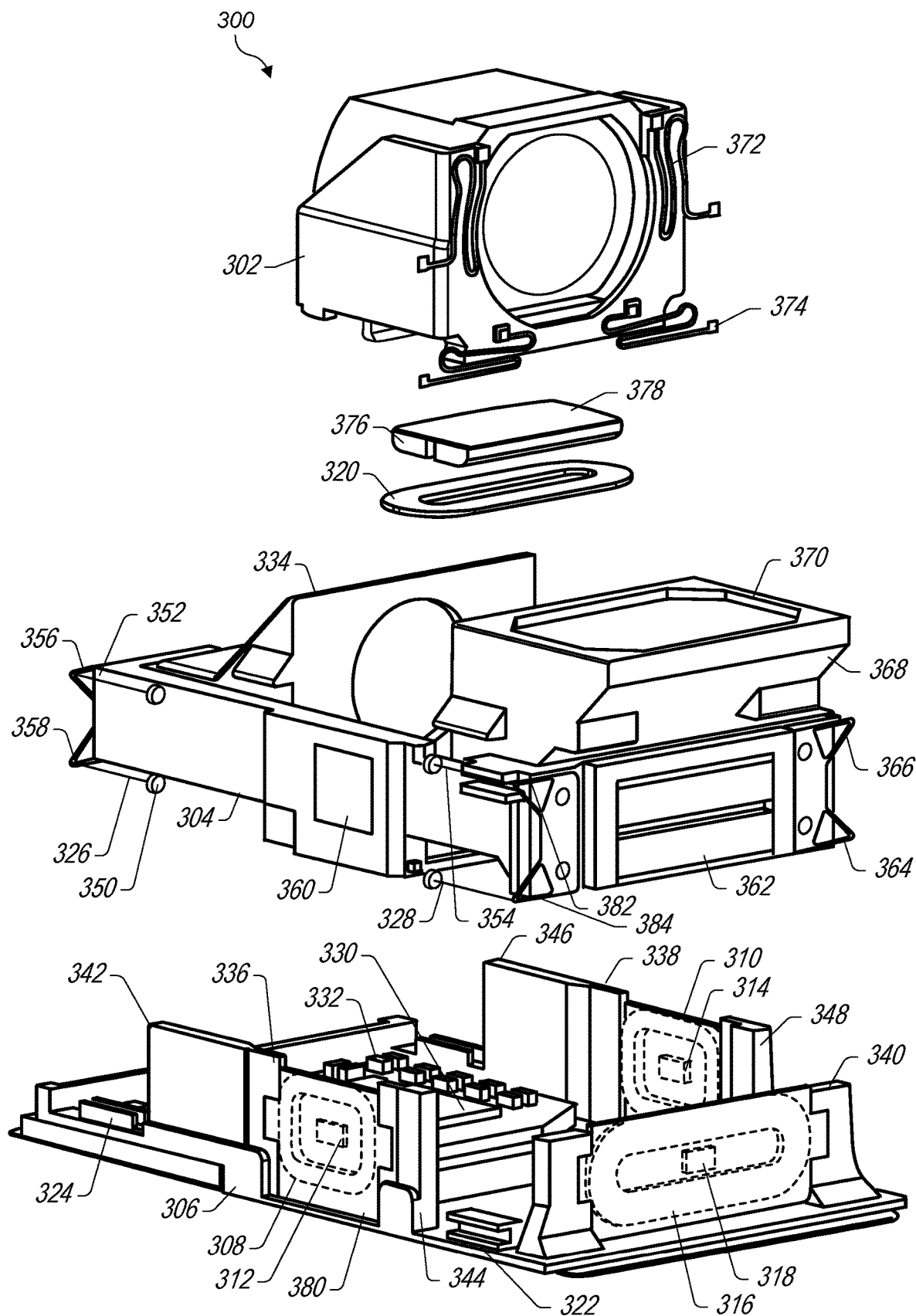
FIG. 3 illustrates an exploded view of a folded optics arrangement camera that includes a voice coil motor actuators and a horizontal suspension wire arrangement, according to some embodiments.

FIG. 3 illustrates an exploded view of a folded optics arrangement camera that includes a voice coil motor actuator assembly comprising voice coil motor actuators and a horizontal suspension wire arrangement, according to some embodiments.

Folded optics arrangement camera 300 includes lens carrier 302, carrier frame 304, and static structure 306. In some embodiments, static structure 306 may mount to a casing or other fixed component of a device in which folded optics arrangement camera 300 is mounted. In some embodiments, coils are mounted to the static structure 306 and together with magnets mounted to the carrier frame 304, and lens carrier 302 form voice coil motor actuators that exert Lorentz forces to cause adjustments of optical components of the folded optics arrangement camera 300, such as carrier frame 304 and/or lens carrier 302.

In some embodiments, optical image stabilization (OIS) coils that act in the Y-direction are mounted on either side of the static structure 306. The OIS coils may, in conjunction with associated magnets, form voice coil motor actuators that cause carrier frame 304 to move in the Y-direction. For example, OIS-Y coil 308 is mounted on a first side of the static structure 306 and an additional OIS-Y coil 310 is mounted on a second side of the static structure 306 opposite OIS-Y coil 308. The OIS-Y coils interact with respective magnets 360 mounted on either side of carrier frame 304 to generate Lorentz forces to actuate movement of carrier frame 304 in the Y-direction.

In some embodiments, sensors may be mounted in the coils. For example, hall sensor 312 is mounted in OIS-Y coil 308 and hall sensor 314 is mounted in OIS-Y coil 310. Sensors, such as hall sensors 312 and 314, may sense magnetic fields at the respective coils and may be used to control voice coil motor actuators (VCM actuators) such as VCM actuators associated with OIS-Y coils 308 and 310.

In some embodiments, an additional coil is mounted to the static structure 306 at an end of the static structure 306 to provide optical image stabilization in the Z-direction (OIS-Z). For example, OIS-Z coil 316 is mounted at an end of static structure 306 and hall sensor 318 is mounted in OIS-Z coil 316. In some embodiments, magnets associated with OIS-Y coils 308 and 310 are single pole magnets, whereas a dual pole magnet or magnets is associated with OIS-Z coil 316. Additionally, another coil may be mounted on a base of static structure 306 to generate Lorentz forces causing movements in the X-direction, which corresponds with an autofocus direction for the folded optics arrangement camera 300. For example, AF-X coil 320 shown above in the exploded view of FIG. 3 may mount on a base of static structure 306 between the first and second sides of the static structure 306 to which the OIS-Y coils 308 and 310 are respectively mounted. Though not shown, in some embodiments, a hall sensor may be mounted to a base of static structure 306 in an opening of AF-X coil 320, in a similar manner as hall sensors 312, 314, and 318 are mounted in openings of OIS-Y coils 308 and 310 and OIS-Z coil 316.

In some embodiments, a static structure may further include one or more channels, such as channels 322 and 324. When assembled, suspension wires, such as suspension wires 326 and 328 may pass through the channels 322 and 324. In some embodiments, channels, such as channels 322 and 324, may be filled with a damping substance such as a gel, rubber, or other viscous material that provides damping to a suspension system of an actuator assembly associated with folded optics arrangement camera 300.

In some embodiments, an image sensor, such as image sensor 330, may also be mounted to static structure 306. In some embodiments, an image sensor may include a light sensing portion, circuitry, and associated packaging. In some embodiments, one or more pads 332 may be mounted adjacent to an image sensor and may support a prism module that mounts above the image sensor. For example, when assembled, prism 334 may mount above image sensor 330 and may be supported by pads 332.

In some embodiments, a carrier frame, such as carrier frame 304 may fit within outer wall structures of a static structure, such as the outer wall structures 336, 338, and 340 of static structure 306 that include OIS-Y coils 308 and 310 and OIS-Z coil 316, respectively. In some embodiments, the outer wall structures may include static bases to which suspension wires are mounted. For example, static structure 306 may include outer wall structures 336, 338, and 340, within which OIS-Y coils 308 and 310 and OIS-Z coil 316 are mounted. Also, static bases 340 and 344 may be included in outer wall structure 336 and static bases 346 and 348 may be included in outer wall structure 338. Though shown in an exploded view in FIG. 3, in some embodiments, base pads associated with suspension wires, such as base pads 350 associated with suspension wires 326 and 328 may be molded into static bases, such as static bases 342, 344, 346, and 348. For example, in some embodiments, base pads 350 may be metal pads that are included in molded plastic static bases 342, 344, 346, and 348. In some embodiments, suspension wires 326, 328 and other ones of the suspension wires shown in FIG. 3 may be soldered to a respective base pad included in a static base of a static wall to mechanically connect an end of each of the suspension wires to the static structure 306.

As can be seen in FIG. 3, the suspension wires, such as suspension wires 326, 328, 352, and 354, may run horizontally along a length of the folded optics arrangement camera (as opposed to a vertical orientation in an up and down direction along a height of the folded optics arrangement camera). In some embodiments, the horizontal direction along which the suspension wires run may be in a same direction as an optical axis of the folded optics camera, such as optical axis portion 118 of optical path 114 shown in FIG. 1 that passes through lens 102 of lens carrier 104. In some embodiments, lens carrier 302 may move in similar manners as described for lens carrier 104 in regard to FIGS. 1-2.

In some embodiments, horizontally arranged suspension wires may reduce an overall Z-height of a folded optics arrangement camera as opposed to other camera types that do not use horizontally arranged suspension wires. This is because the suspension wires may run along a side of the folded optics camera without extending beyond the boundaries of the folded optics camera. For example, other types of cameras may mount suspension wires to a static structure outside of a camera, thus causing the suspension wires to extend beyond the boundaries of the other type of camera. In contrast, a folded optics arrangement camera as illustrated in FIG. 3 may include suspension wires that are within outer boundaries of the folded optics camera and that do not extend beyond these boundaries. For example, suspension wires 326 and 352 may extend between flex tabs 356 and 358 and static base 342 of wall structure 336. In this way, the suspension wires fit within an outer envelope of folded optic arrangement camera 300. Also, suspension wires mounted horizontally, such as suspension wires 326, 328, 352, 354 (and additional suspension wires on an opposite side of folded optics arrangement camera 300 not shown in FIG. 3), may be longer than suspension wires typically used in vertical suspension arrangements. This is because the respective lengths of the suspension wires may not affect the overall dimensions of the folded optics arrangement camera 300. Additionally, longer suspension wires may reduce stresses experienced by the suspension wires by distributing forces experienced by a suspension wire over a longer length of wire. In a similar manner, flex tabs 356, 358 and corresponding flex tabs 364, 366, 382, 384 (and another set of flex tabs not show in FIG. 3 associated with other ones of the suspension wires) may flex in response to sudden forces as may be experienced when a device containing a folded optics arrangement camera 300 is dropped. The flex tabs may be mounted to the carrier frame 304 and along with the suspension wires connect the carrier frame to the static structure 306.

In some embodiments, flexure of the flex tabs may also help absorb sudden forces such that stress on suspension wires are reduced and such that suspension wires, such as suspension wires 326, 328, 352, and 354 do not fail when a device containing folded optics arrangement camera 300 is dropped or otherwise experiences sudden forces.

In some embodiments, carrier frame 304 may also include magnets mounted on or otherwise attached to the carrier frame 304. For example, single pole magnet 360 is mounted on carrier frame 304 and moves with carrier frame 304. Also dual pole magnet(s) 362 are mounted to carrier frame 304 and move with carrier frame 304. In some embodiments, single pole magnet 360 (and an additional single pole magnet on an opposite side of carrier frame 304) may interact with OIS-Y coils 308 and 310 to provide OIS-Y actuation. Also, dual pole magnet(s) 362 may interact with OIS-Z coil 316 to provide OIS-Z actuation.

In some embodiments, prisms 368 and 334 may mount in carrier frame 304 and may move with carrier frame 304. In some embodiments, prism 368 may include an aperture 370 through which light enters folded optics arrangement camera 300 and prism 334 may direct light that has passed through lenses of lens carrier 302 towards image sensor 330. In some embodiments lens carrier 302 may include one or more lens, such as lens carrier 104 illustrated in FIG. 1 that includes lenses 102.

In some embodiments, a lens carrier may mount between prisms 368 and 334 via suspension springs 372 and 374. In some embodiments, suspension springs 372 may allow motion of the lens carrier 302 relative to the carrier frame 304 in the X-direction (autofocus direction along the optical axis), but may prevent motion of the lens carrier 302 relative to the carrier frame 304 in a vertical or Z-direction. Also, suspension springs 374 may allow motion of the lens carrier 302 relative to the carrier frame 304 in the X-direction (autofocus direction along the optical axis), but may prevent motion of the lens carrier 302 relative to the carrier frame 304 in a side-to-side or Y-direction. Because collectively suspension springs 372 and 374 allow motion of the lens carrier 302 relative to the carrier frame 304 in the X-direction but restrict motion of the lens carrier 302 relative to the carrier frame in the Z and Y directions, the lens carrier 302 may be restricted to motion in the X-direction relative to the carrier frame 304.

In some embodiments, a dual pole magnet(s) 376 may be mounted to lens carrier 302 and may interact with AF-X coil 320 to move the lens carrier 302 relative to carrier frame 304 in an auto focus direction (X-direction) to focus folded optics arrangement camera 300. Also, suspension wires 326, 328, 352 and 354 may be rigid or semi-rigid in the X-direction thus preventing motion of the carrier frame 304 relative to static structure 306 in the X-direction, but may be flexible in directions orthogonal to the X-direction, such that carrier frame 304 (and lens carrier 302 mounted within carrier frame 304) may move in the Y and Z directions. For example carrier fame 304 and lens carrier 302 may move in response to Lorentz forces generated between OIS-Y coils and their respective single pole magnets, and the OIS-Z coils and their respective dual-pole magnet(s).

In some embodiments, dual pole magnets, such as dual pole magnet(s) 376 and dual pole magnet(s) 362 may be mounted to a ferromagnetic pad 378 that re-directs magnetic fields associated with the magnets towards a respective set of coils associated with the respective magnet.

In some embodiments, OIS-Y coils 308 and 310, OIS-Z coils 316, and AF-X coils 320 may be mounted to a common substrate such as a piece of sheet metal and tabs of the substrate may be bent upwards to position the OIS-Y coils and the OIS-Z coils in a position in the respective static walls 336, 338, and 340. For example, as shown in FIG. 3, a tab to which a coil is mounted may fit within an opening in a static wall, such as tab 380 that includes OIS-Y coil 308 and that is bent up into an opening in static wall 336.

Figure 4:
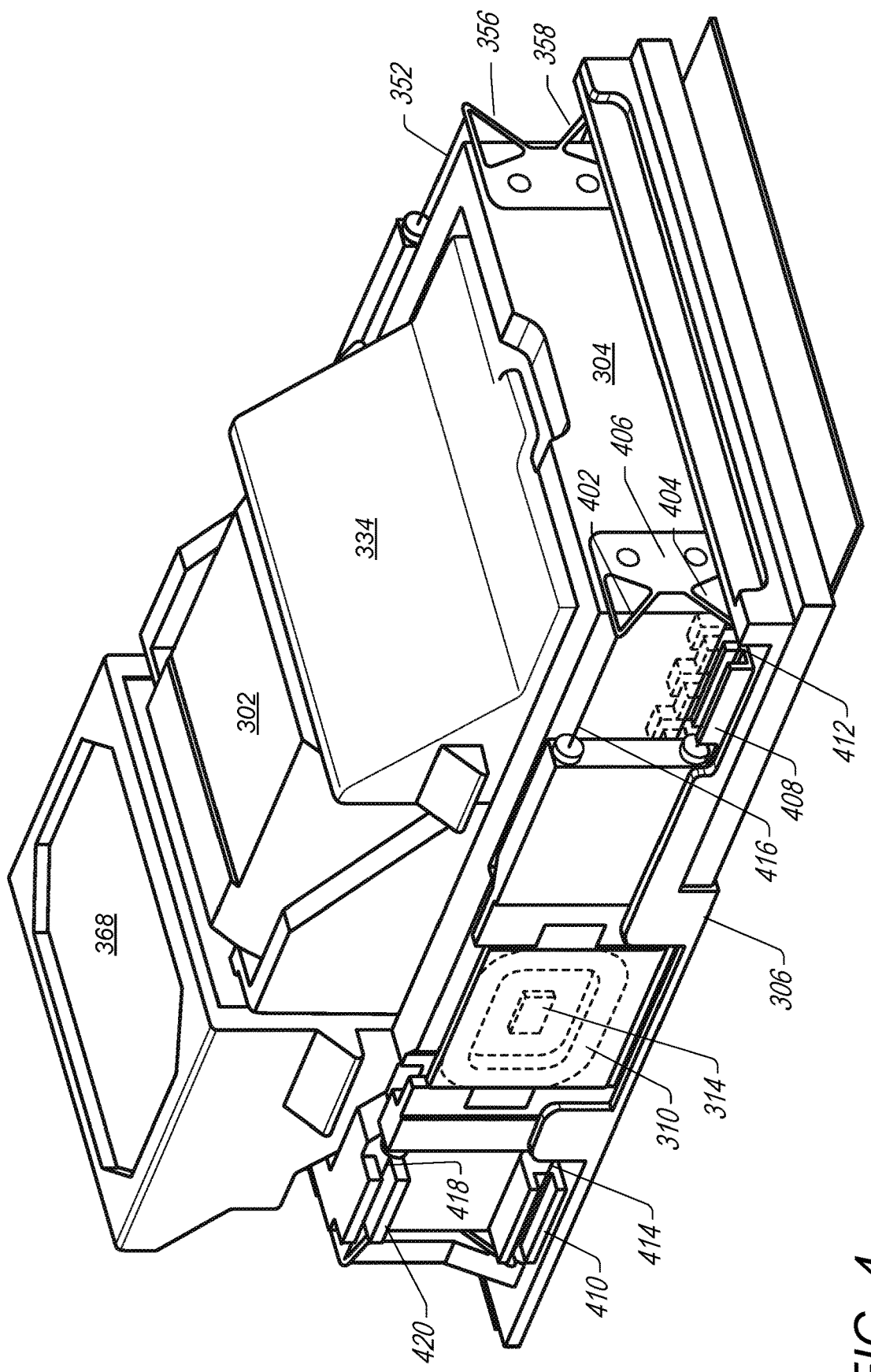
FIG. 4 illustrates a perspective view of an assembled folded optics arrangement camera that includes voice coil motor actuators and a horizontal suspension wire arrangement, according to some embodiments.

FIG. 4 illustrates a perspective view of an assembled folded optics arrangement camera that includes a voice coil motor assembly comprising voice coil motor actuators and a horizontal suspension wire arrangement, according to some embodiments.

The folded optics arrangement camera illustrated in FIG. 4 may be an assembled version of the exploded view folded optics arrangement camera 300 shown in FIG. 3. As can be seen in FIG. 4, lens carrier 302 is mounted between prism 368 and prism 334. Also, lens carrier 302, prism 368, and prims 334 are mounted in carrier frame 304 that is in turn mounted in static structure 306. Lens carrier 302 may be actuated to move in an autofocus (X-direction) such that lens carrier 302 moves closer to or further away from prism 334. Note that as explained in regard to FIG. 3, image sensor 330 may be mounted to static structure 306 and positioned under prism 334. Also carrier frame 304 may move in a Y-direction and Z-direction due to forces exerted by voice coil motors. For example, OIS-Y coil 310 may, in conjunction with a single-pole magnet 360 mounted to carrier frame 304 cause the carrier frame 304 to move in the Y-direction. In a similar manner OIS-Z coil 316 and associated dual pole magnets 362 mounted to carrier frame 304 may cause the carrier frame 304 to move in the Z-direction.

As shown in FIG. 4 flex tabs 402 and 404 (which were on a back-side not visible in FIG. 3) and flex tab 356 and flex tab 358 are mounted on carrier frame 304. In some embodiments, a set of flex tabs may be included in a bracket 406 that is attached to a corner of carrier frame 304. In some embodiments each corner of carrier frame 304 may include a bracket comprising two flex tabs that connect with a set of two suspension wires, wherein the suspension wires and flex tabs mechanically connect the carrier frame 304 to a static structure 306.

In a similar manner as described in regard to FIG. 3, static structure 306 may include channels, such as channels 408, 410, and 420, and suspension wires, such as suspension wires 412, 414, and 418, may pass through the channels. In some embodiments, the channels may include a damping material, such as a gel or other viscous material. In some embodiments, each suspension wire may pass through a respective channel or some suspension wires, such as suspension wire 416 may be connected without passing through a channel. In some embodiments, different materials may be included in different channels to adjust damping as needed. Also channels may be included or omitted to adjust damping as needed.

Figure 5:
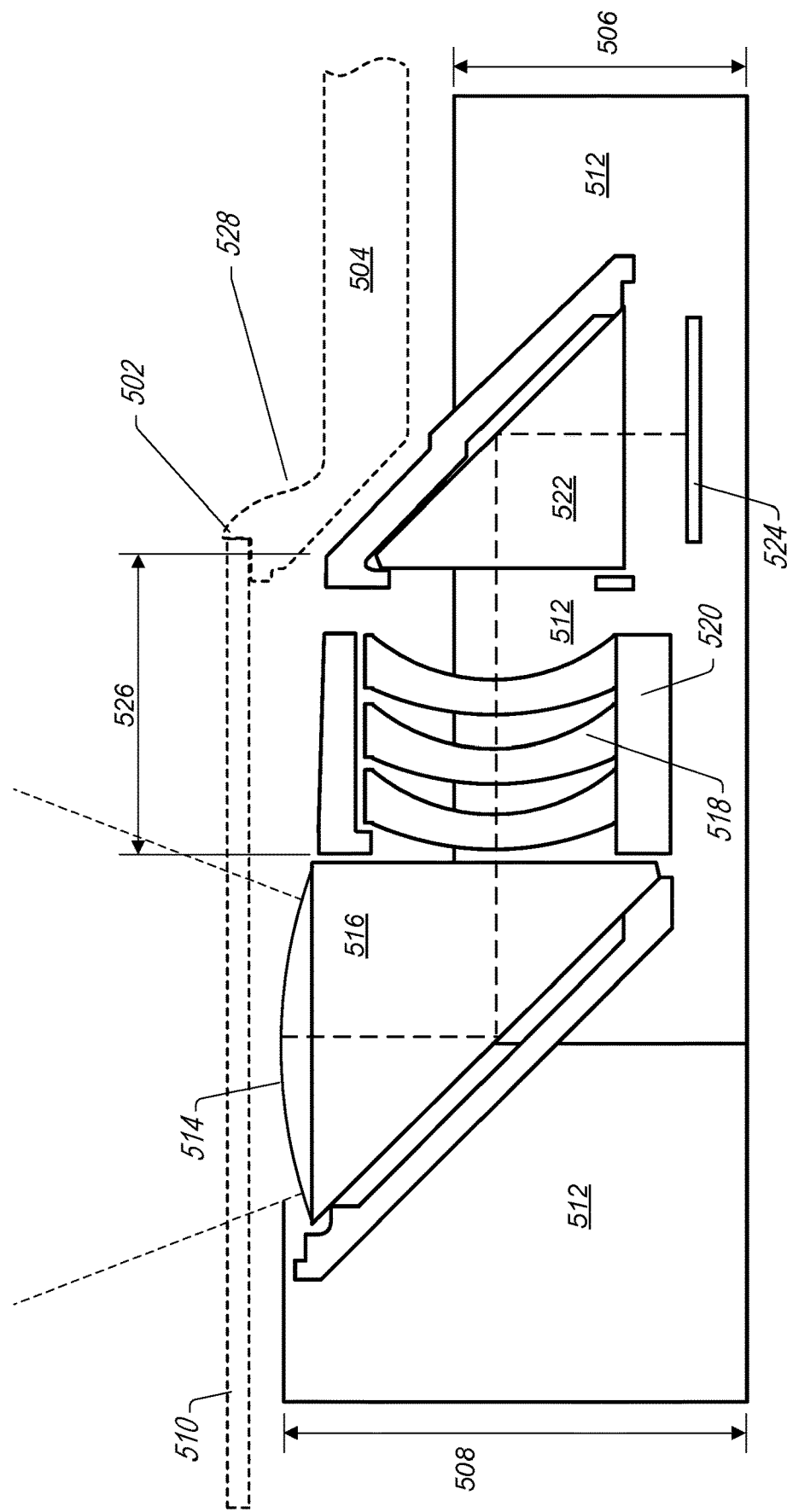
FIG. 5 illustrates a cut-away view of a folded optics arrangement camera mounted in a mobile device casing, according to some embodiments.

FIG. 5 illustrates a cut-away view of a folded optics arrangement camera mounted in a mobile device casing, according to some embodiments.

In some embodiments, a folded optics arrangement camera, such as folded optics arrangement camera 300 described in regard to FIGS. 3 and 4, may be mounted in a device casing that includes a turret, such as turret 502.

For example, folded optics arrangement camera 512 mounted within device casing 504 has a first Z-height dimension 506 that does not include a portion of folded optics arrangement camera 512 extending out into turret 502 and a second Z-height dimension 508 that is greater than first Z-height dimension 506 and that includes a distance for which folded optics arrangement camera 512 extends out into turret 502, which in turn extends out from a planar surface of device casing 504. In some embodiments, a turret 502 may include a window 510 and a portion of folded optics camera 512 may be mounted behind the window 510. Light may pass through window 510 and enter folded optics camera 512 via aperture 514. The light may be reflected off of prism 516 and pass through lenses 518 of lens carrier 520. The light, after passing through lenses 518 of lens carrier 520, may be reflected off of prism 522 and directed to image sensor 524 of folded optics arrangement camera 512. In some embodiments, lens carrier 520 may have a travel distance 526 between prism 516 and 522 wherein a position of the lens carrier along travel distance 526 is adjusted to focus the folded optics arrangement camera 512.

In some embodiments, the first Z-height dimension of the folded optics arrangement camera 512 (also referred to as a shoulder height) may be between 4 and 5 millimeters. The first Z-height dimension may correspond to a portion of the folded optics arrangement camera 512 that is positioned beneath a shoulder 528 of the turret 502. In some embodiments, the second Z-height dimension of the folded optics arrangement camera 512 (also referred to as a turret height) may be between 7 and 8 millimeters and may correspond to a portion of the folded optics arrangement camera 512 that extends out into the turret 502. In some embodiments, the length of the folded optics arrangement camera 512 may be less than 20 millimeters and the width of the folded optics arrangement camera 512 may be less than 13 millimeters. In some embodiments, other ones of the folded optics arrangement cameras described herein, such as in FIGS. 1-4 and 6-16 may have similar dimensions as folded optics camera 512 and may fit partially within a turret of a device case, as shown in FIG. 5.

In some embodiments, suspension wires of an actuator assembly, such as the suspension wires discussed in regard to FIGS. 3-4, may be oriented in a direction perpendicular to a height of a turret, such as turret 502. Also, because the suspension wires run perpendicular to the turret height, the length of the suspension wires may be independent of the turret height, e.g. the length of the suspension wires is de-coupled from the turret height.

Figure 6A:
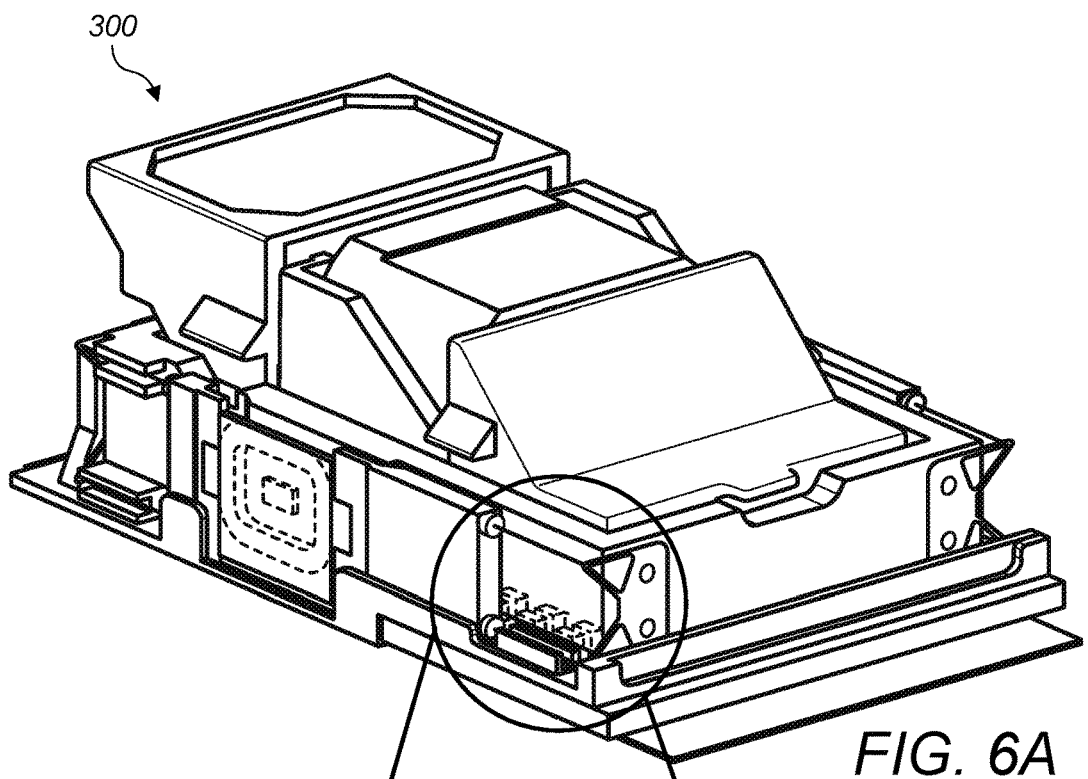
FIG. 6A is a perspective view of an assembled folded optics arrangement camera that includes voice coil motor actuators and a horizontal suspension wire arrangement, according to some embodiments.

FIG. 6A is a perspective view of an assembled folded optics arrangement camera that includes voice coil motor actuators and a horizontal suspension wire arrangement, according to some embodiments. For example, the folded optics arrangement camera and actuator assembly illustrated in FIG. 6A may be the same as folded optics arrangement camera 300 illustrated in FIGS. 3 and 4.

Figure 6B:
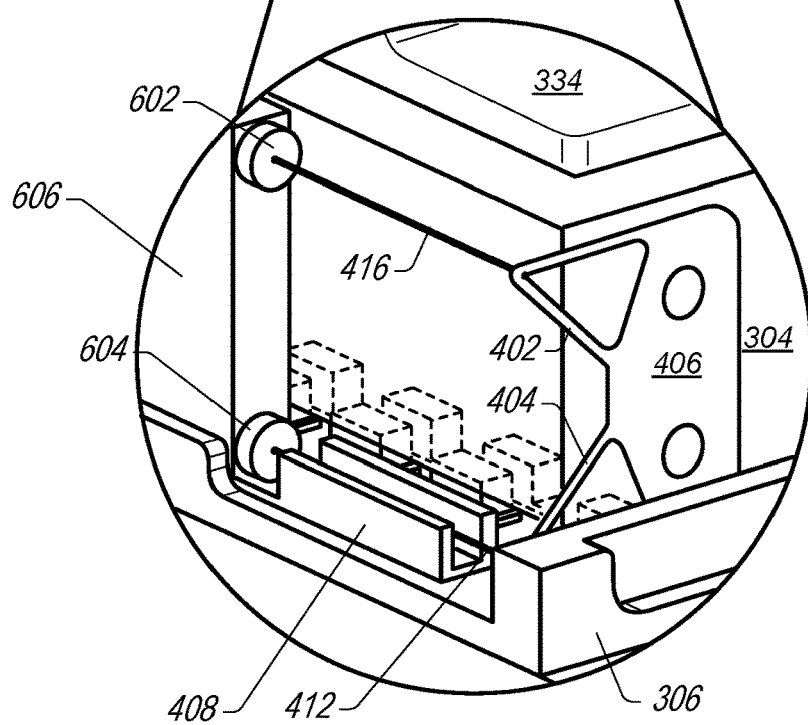
FIG. 6B is a zoomed-in perspective view illustrating horizontal suspension wires of a folded optics arrangement camera, according to some embodiments.

FIG. 6B is a zoomed-in perspective view illustrating horizontal suspension wires of a folded optics arrangement camera, according to some embodiments. As shown in FIG. 6B, bracket 406 that includes flex tabs 402 and 404 is mounted to carrier frame 304. Suspension wires 416 and 412 are connected at respective first ends to flex tabs 402 and 404, respectively, and are connected at respective second ends to base pads 602 and 604. In some embodiments, any of the base pads 350 described above in regard to FIG. 3 may be arranged in a similar manner as base pads 602 and 604 illustrated in FIG. 6B. In some embodiments, each of the suspension wires 326, 328, 352, 354, 412, 414, 416, and 418 may be connected at a first end to a flex tab of a bracket mounted to the carrier frame 304 and may be connected at a second end to a base pad mounted in a static base of a static wall structure, such as base pads 602 and 604 mounted in static base 606 of a static wall structure of static structure 306. In some embodiments, channel 408 may be filled with a viscous material such as a gel or rubber that provides damping to the actuator assembly (e.g. to carrier frame 304). In some embodiments, the static base 606 may be made of a plastic material and base pads 602 and 604 may be metal inserts embedded in the plastic material of the static base. In some embodiments, a carrier frame may be pre-assembled with attached brackets that include flex tabs and attached suspension wires attached to the flex tabs. In some embodiments, to assemble an actuator assembly, after placing carrier frame 304 into static structure 306, loose ends of the suspension wires may be soldered to respective base pads.

Figure 6C:
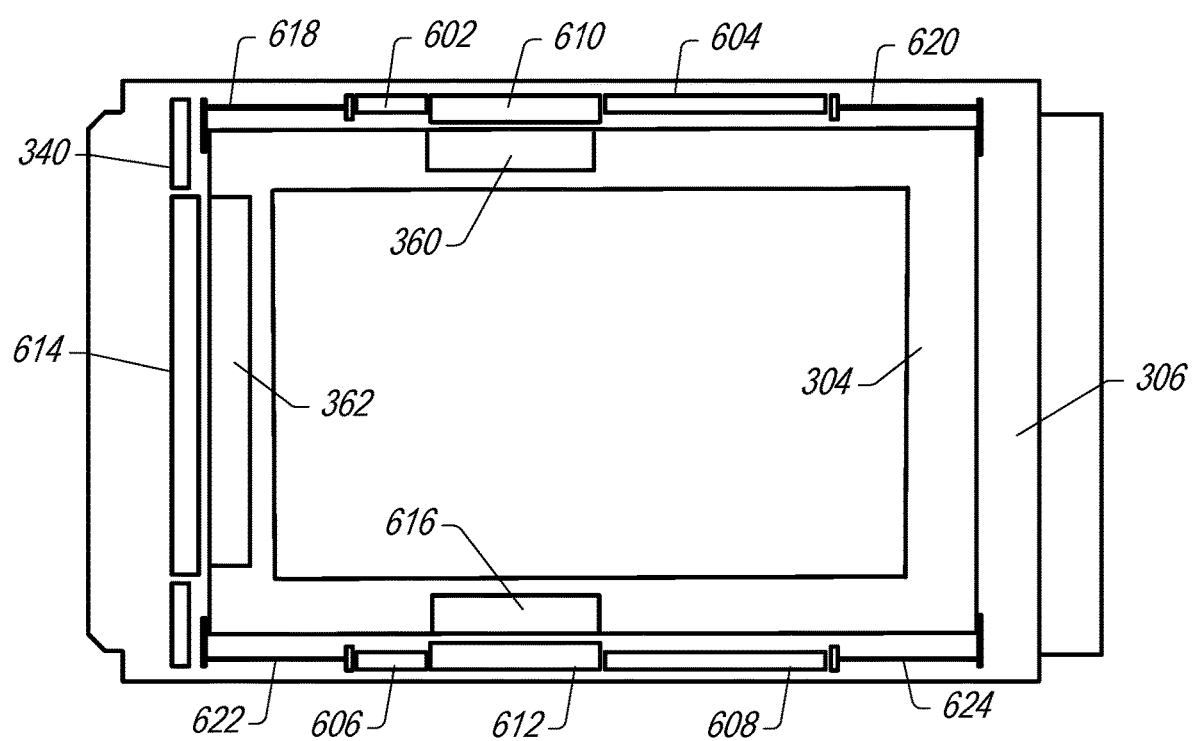
FIG. 6C is a top view of a folded optics arrangement camera that includes voice coil motor actuators and a horizontal suspension wire arrangement, according to some embodiments.

FIG. 6C is a top view of a folded optics arrangement camera that includes voice coil motor actuators and a horizontal suspension wire arrangement, according to some embodiments.

As shown in FIG. 6C, carrier frame 304 is mounted within wall structures of static structure 306. For example, carrier frame 304 is mounted within boundaries defined by static bases 602, 604, 606, and 608 of static structure 306 and wall structure 340 of static structure 306. In some embodiments tabs 608 and 612 each include a respective OIS-Y coil and are bent up to fit within an opening between static base 602 and 604, and an opening between static base 606 and 608, respectively. Also, tab 614 is bent up to fit within an opening of wall structure 340. In some embodiments, tabs 610, 612, and 614 are part of a common assembly included in static structure 306 or coupled to static structure 306. For example, in some embodiments, tabs 610, 612, and 614 are tabs of a sheet metal structure that is included in or coupled to static structure 306, and that are bent up around carrier frame 304.

Also, as shown in FIG. 6C, carrier frame 304 may be a magnet holder in addition to being a carrier frame for the lens carrier 302. For example, single pole OIS-Y magnet 360 may be mounted on a first side of carrier frame 304 and an additional single pole OIS-Y magnet 616 may be mounted on an opposite side of carrier frame 304. Additionally, dual pole OIS-Z magnet 362 may be mounted on a third side of carrier frame 304 orthogonal to the first side of carrier frame 304. In some embodiments, a set of two suspension wires may mechanically connect each corner of carrier frame 304 to respective ones of the static bases. For example a set of two suspension wires 618 may connect a first corner of carrier frame 304 to static base 602. Another set of two suspension wires 620 may connect a second corner of carrier frame 304 to static base 604. Also, a set of suspension wires 622 may connect a third corner of carrier frame 304 to static base 606 and a set of suspension wires 624 may connect a fourth corner of carrier frame 304 to static base 608.

In some embodiments, an actuator assembly may include a total of eight suspension wires with two suspension wires connected to each corner of a carrier frame. In some embodiments, other combinations of suspension wires may be used. In some embodiments, using two suspension wires for each corner of a carrier frame may reduce a tilt mode of the carrier frame as compared to using a single suspension wire. This is because the two suspension wires may provide a more stable base as compared to a single point connection. Additionally, use of two suspension wires may reduce stresses experienced by the suspension wires by distributing forces across the set of two suspension wires.

Figure 7A:
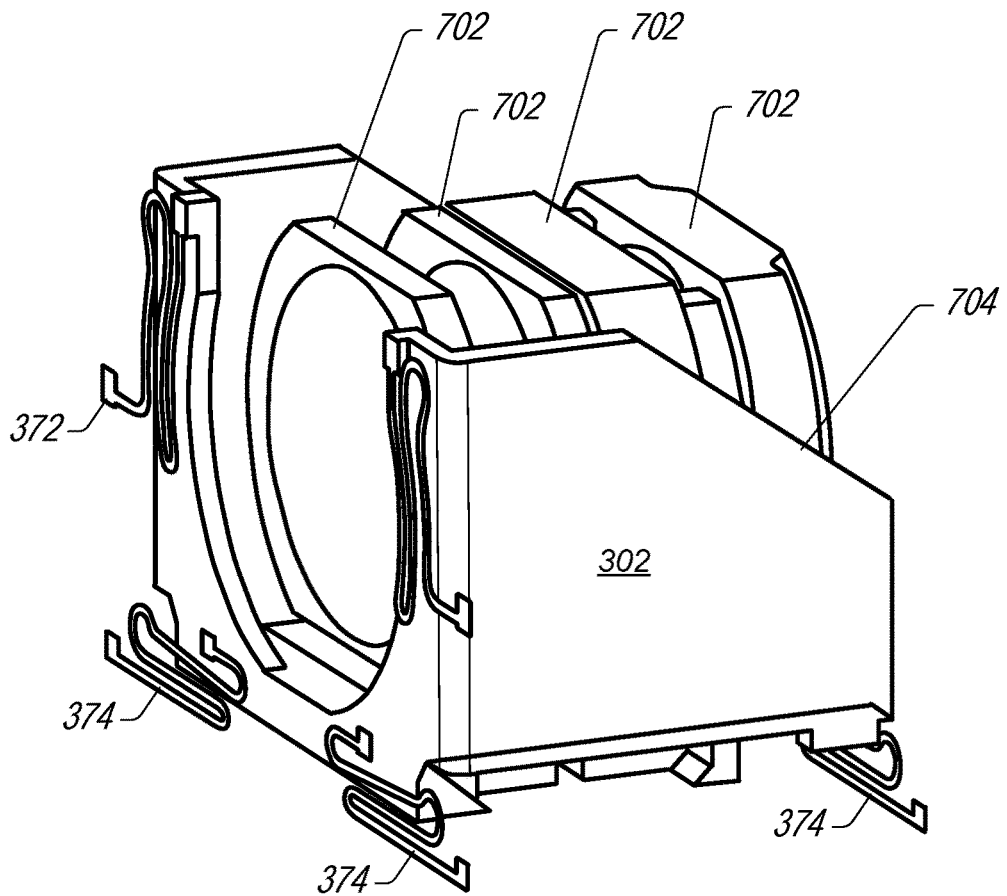
FIG. 7A is a perspective view of lens carrier of a folded optics arrangement camera, according to some embodiments.

FIG. 7A is a perspective view of lens carrier of a folded optics arrangement camera, according to some embodiments.

FIG. 7A illustrates lens carrier 302 and suspension springs 372 and 374. In some embodiments, a lens carrier, such as lens carrier 302, may include multiple lenses 702. In some embodiments, a lens carrier, such as lens carrier 302, may also include a lens carrier casing 704 that is angled along the optical axis of the lens carrier such that a height of the lens carrier casing at a first end is lower than a height of the lens carrier casing at a second end. In some embodiments, an angled lens carrier casing may fit under a shoulder of a turret as shown in FIG. 5. In some embodiments, suspension springs 372 may restrict vertical or Z-motion of the lens carrier, but allow motion of the lens carrier along an optical axis running through the lenses 702. In some embodiments, suspension springs 374 may restrict side-to-side motion or Y-motion of the lens carrier, but allow motion of the lens carrier along the optical axis. In some embodiments, a lens carrier may be connected to a carrier frame using a greater quantity of lower suspension springs 374 than upper suspension springs 372. In some embodiments, no upper suspension springs 372 may be connected to an angled lower end of the lens carrier casing 704.

In some embodiments, a lens carrier may be coupled to a carrier fame using fewer than eight suspension springs. In some embodiments, upper suspension springs 372 and lower suspension springs 374 may have different spring coefficients (k). In some embodiments, spring coefficients (k) for the upper suspension springs 372 and the lower suspension springs 374 may be selected such that the lens carrier and carrier frame assembly have a first mode of free rotational normal vibration about the optical axis running through lenses 702.

Figure 7B:
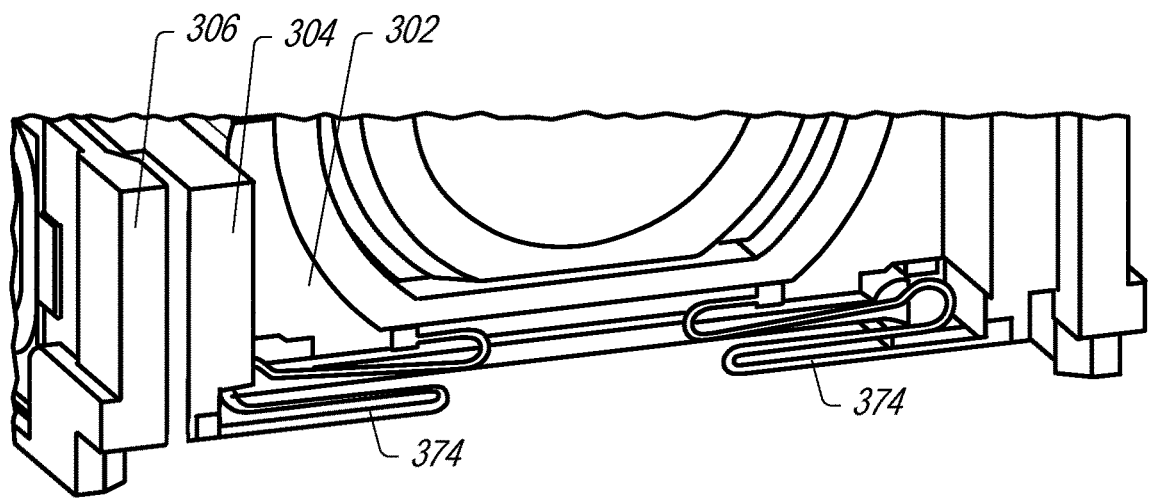
FIG. 7B is a zoomed-in perspective view of suspension springs associated with the lens carrier illustrated in FIG. 7A, according to some embodiments.

FIG. 7B is a zoomed-in perspective view of suspension springs associated with the lens carrier illustrated in FIG. 7A, according to some embodiments.

As shown in FIG. 7B suspension springs (e.g. suspension springs 372 and 374) may mechanically connect a lens carrier 302 to a carrier frame 304 that is mounted within a static structure 306, wherein the carrier frame 304 is coupled to the static structure 306 via suspension wires as described herein.

Figure 8A:
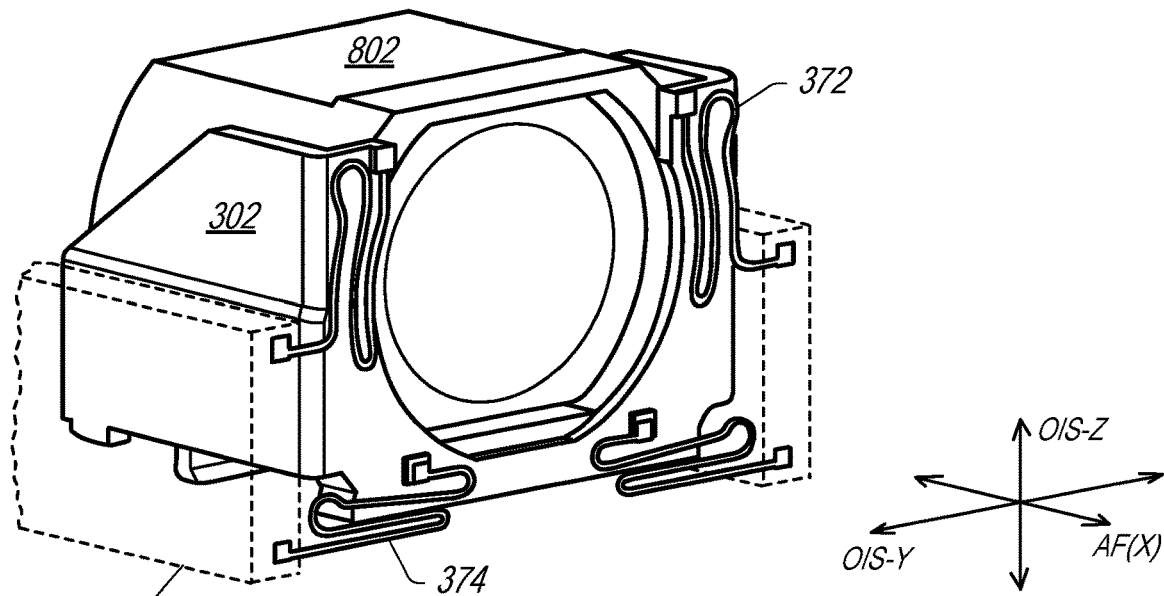
FIG. 8A illustrates a perspective view of a lens carrier of a folded optics arrangement camera, wherein the lens carrier translates along an optical axis relative to a carrier frame of the folded optics arrangement camera, according to some embodiments.

FIG. 8A illustrates a perspective view of a lens carrier of a folded optics arrangement camera, wherein the lens carrier translates along an optical axis relative to a carrier frame of the folded optics arrangement camera, according to some embodiments.

In some embodiments, lenses, such as lenses 702, may be mounted in a lens barrel 802 and the lens barrel 802 may mount in a lens carrier 302, as shown in FIG. 8A. In some embodiments, lenses may mount directly in a lens carrier without using a lens barrel, such as lens barrel 802.

In some embodiments, suspension springs 372 and 374 may twist to allow motion in an autofocus or X-direction, but may restrict motion in directions orthogonal to the X-direction, such as the Y-direction or the Z-direction.

Figure 8B:
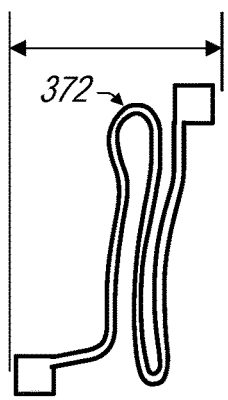
FIGS. 8B-8C illustrate elongation of suspension springs that allow motion of a lens carrier along an optical axis of a folded optics arrangement camera, but prevent vertical motion of the lens carrier in directions orthogonal to the optical axis of the folded optics arrangement camera, according to some embodiments.
Figure 8C:
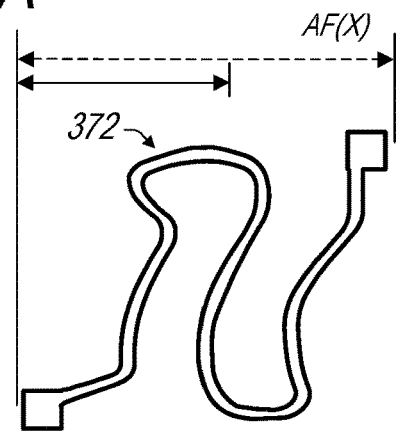

FIGS. 8B-8C illustrate elongation of suspension springs that allow motion of a lens carrier along an optical axis of a folded optics arrangement camera, but prevent vertical motion of the lens carrier in directions orthogonal to the optical axis of the folded optics arrangement camera, according to some embodiments.

For example, suspension springs 372 may prevent motion in the Z-direction, but may elongate to allow motion of the lens carrier 302 relative to the carrier frame 304 in the X-direction.

Figure 8D:
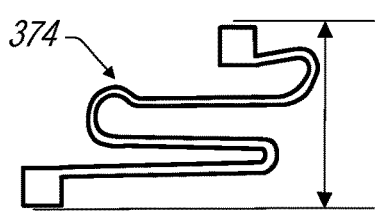
FIGS. 8D-8E illustrate elongation of suspension springs that allow motion of a lens carrier along an optical axis of a folded optics arrangement camera, but prevent side-to-side motion of the lens carrier in directions orthogonal to the optical axis of the folded optics arrangement camera, according to some embodiments.
Figure 8E:
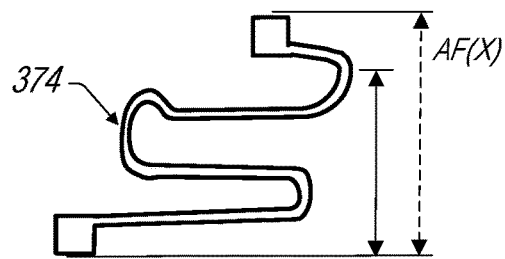

FIGS. 8D-8E illustrate elongation of suspension springs that allow motion of a lens carrier along an optical axis of a folded optics arrangement camera, but prevent side-to-side motion of the lens carrier in directions orthogonal to the optical axis of the folded optics arrangement camera, according to some embodiments.

As another example, suspension springs 374 may prevent motion in the Y-direction, but may elongate to allow motion of the lens carrier 302 relative to the carrier frame 304 in the X-direction.

Figure 9A:
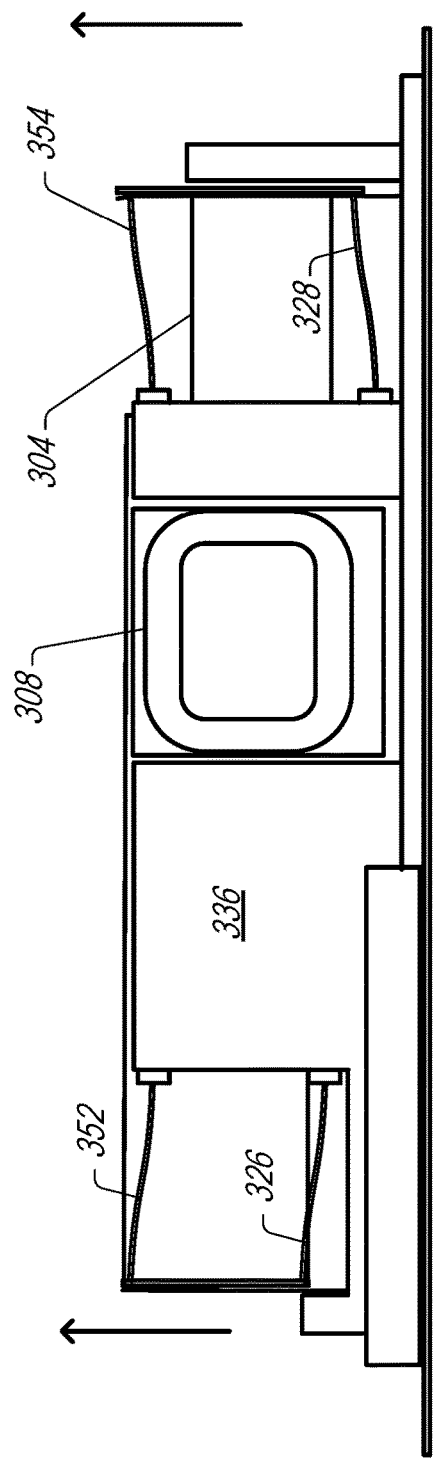
FIGS. 9A-9B illustrate a side view of a static structure of a folded optics arrangement camera and motion of a carrier frame of the folded optics arrangement camera relative to the static structure, according to some embodiments.
Figure 9B:
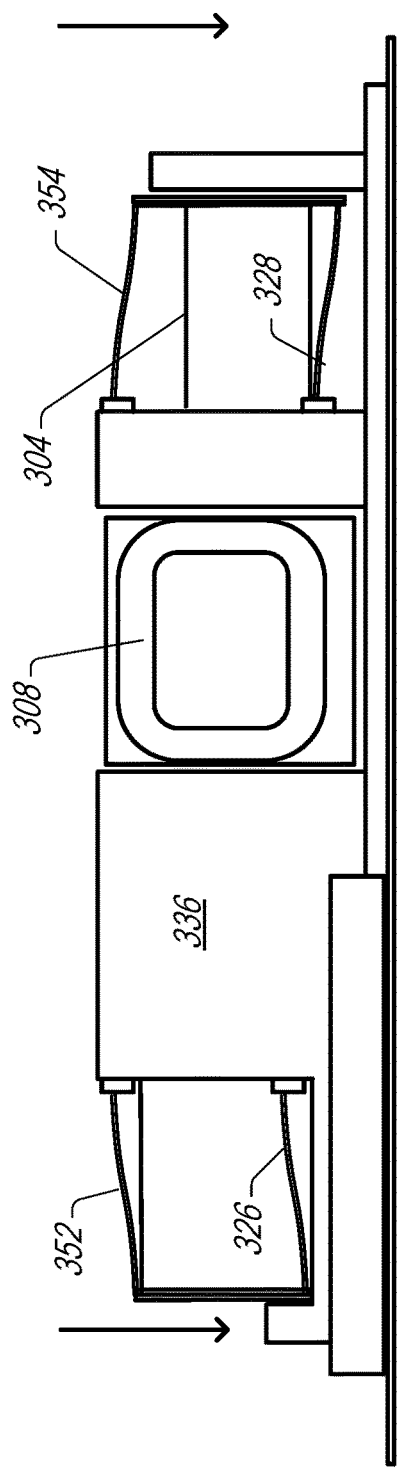

FIGS. 9A-9B illustrate a side view of a static structure of a folded optics arrangement camera and motion of a carrier frame of the folded optics arrangement camera relative to the static structure, according to some embodiments.

In some embodiments, suspension wires 326, 328, 352, and 354 (and other ones of the suspension wires described herein) may be arranged such that the wires do not allow motion of a carrier frame 304 relative to static structure 306 in the X-direction (autofocus direction), but allow motion of the carrier frame 304 relative to the static structure in optical image stabilization directions, such as the Y-direction and the Z-direction. For example, because suspension wires 326 and 328 are arranged in an opposing arrangement in the X-direction, the suspension wires may prevent motion in the X-direction. For example, movement of the carrier frame 304 to the right may be prevented by tension in suspension wires 328 and 354 and movement to the left may be prevented by tension in suspension wires 326 and 352. However the suspension wires may allow vertical motion of the carrier frame relative to the static structure upwards in the Z-direction as shown in FIG. 9A and may allow vertical motion of the carrier frame relative to the static structure downwards in the Z-direction as shown in FIG. 9B.

Also, as shown in FIGS. 9A and 9B, coils such as OIS-Y coils 308 may be static, while magnets mounted to carrier frame 304 move with the carrier frame 304 when voice coil motor actuators made up of the respective coils and magnets cause actuation of the carrier frame in the OIS-Y direction (or the OIS-Z direction).

Figure 10A:
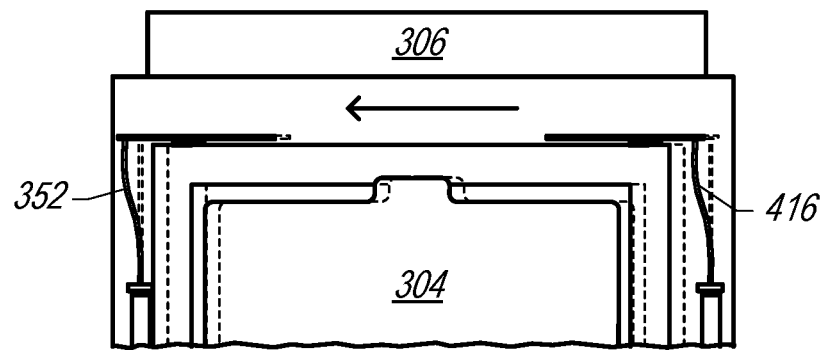
FIGS. 10A-10B illustrate at top view of an end of a carrier frame of a folded optics arrangement camera, wherein the carrier frame moves relative to a static structure of the folded optics arrangement camera, according to some embodiments.
Figure 10B:
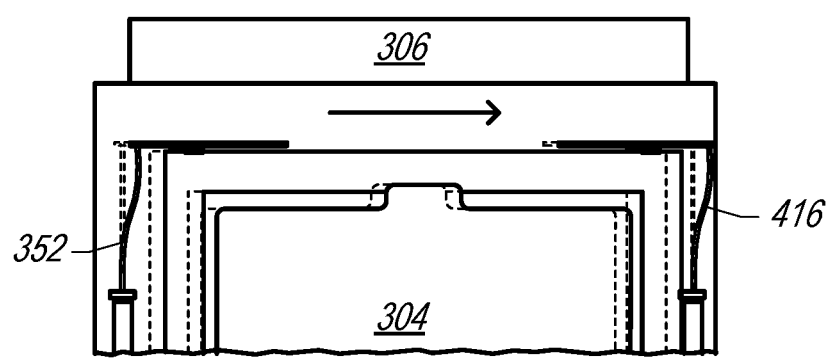

FIGS. 10A-10B illustrate at top view of an end of a carrier frame of a folded optics arrangement camera, wherein the carrier frame moves relative to a static structure of the folded optics arrangement camera, according to some embodiments.

As discussed above, in some embodiments, suspension wires 326, 328, 352, and 354 (and other ones of the suspension wires described herein) may be arranged such that the wires do not allow motion of a carrier frame 304 relative to static structure 306 in the X-direction (autofocus direction), but allow motion of the carrier frame 304 relative to the static structure in optical image stabilization directions, such as the Y-direction and the Z-direction.

For example, FIG. 10A illustrates suspension wires 352 and 416 allowing carrier frame 304 to translate to the left in the Y-direction relative to static structure 306. Also, FIG. 10B illustrates suspension wires 352 and 416 allowing carrier frame 304 to translate to the right in the Y-direction relative to static structure 306.

Figure 11:
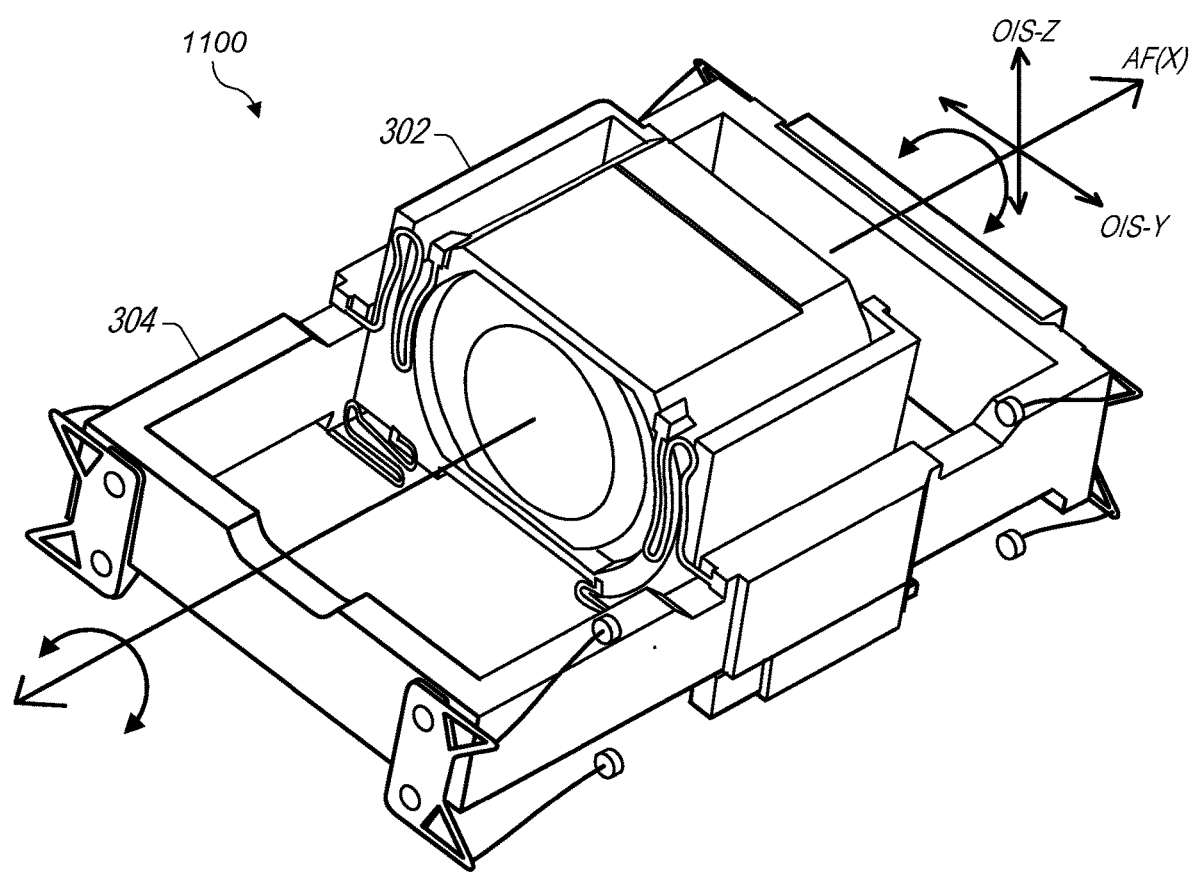
FIG. 11 illustrates a first rotational normal mode of free vibration of a folded optics arrangement camera that includes a horizontal suspension wire arrangement, according to some embodiments.

FIG. 11 illustrates a first rotational normal mode of free vibration of a folded optics arrangement camera that includes a horizontal suspension wire arrangement, according to some embodiments.

As shown in FIG. 11, an actuator assembly 1100 comprising a carrier frame 302 and lens carrier 302 mounted in the carrier frame via suspension springs as described above, wherein the carrier frame is mechanically connected to a static structure via suspension wires as described above, may have a first normal mode of rotational free vibration about the optical axis (e.g. the X-axis or the autofocus direction). In some embodiments, a normal mode of rotational free vibration that causes a lens carrier to rotate about an optical axis of a camera may not negatively affect a quality of a captured image. This is because the lenses of the lens carrier may be symmetrical such that rotation of the lenses does not affect how light is altered as the light passes through the lenses of the lens carrier on the way to the image sensor.

In some embodiments, a center a first normal mode of rotational free vibration of an actuator assembly 1100 may be adjusted by changing masses of respective components of the actuator assembly 1100, such as the lens carrier 302 or the carrier frame 304. Also, the center of the first normal mode of rotational free vibration may be adjusted by changing stiffnesses of springs used to mechanically connect a lens carrier to a carrier frame, such as suspension springs 372 and 374. For example, in some embodiments, a lens carrier may have a moving mass in the X-direction of approximately 300 milligrams. However, in the OIS-Y direction and the OIS-Z direction the moving mass may include the mass of the lens carrier 302 and the carrier frame 304. For example the moving mass in the OIS-Y and OIS-Z directions may be approximately 600 milligrams. In some embodiments, the suspension springs (both upper and lower) may have a combined relative spring coefficient (k) of 72 N/m. The suspension wires may have a combined spring coefficient (k) in the Y-direction and in the Z-direction of 80 N/m. In some embodiments, a stroke distance of a lens carrier within a carrier frame may be approximately 200 micrometers. In some embodiments, a stroke distance of a carrier frame in a Y-direction and in a Z-direction may be approximately 150 micrometers, respectively. In some embodiments, coils used in a voice coil motor, such as OIS-Y coils, OIS-Z coils, and/or AF-coils may include 50 or more turns and may produce Lorentz forces of over $2\times10^{-3}$ N/A per turn. In some embodiments a voice coil motor actuator may have a sensitivity in an autofocus direction of 2 micrometers per micro amp, a sensitivity in the OIS-Y direction of 2.5 micrometers per micro amp, and a sensitivity in the OIS-Z direction of 3.5 micrometers per micro amp. In some embodiments, the respective spring constants of the suspension springs 372 and 374 may be selected or adjusted such that an axis of rotation in the first normal mode of rotational free vibration passes through the center or near the center of the lenses of the lens carrier.

In some embodiments, the first normal mode of rotational free vibration of the actuator assembly 1100 about the optical or X-axis may be excited at a frequency of about 175 Hertz. In some embodiments, other modes of rotational free vibration, such as about the Y-axis or the Z-axis may be excited at frequencies greater than 200 Hertz, but may not be excited at frequencies less than 200 Hertz.

Figure 12A:
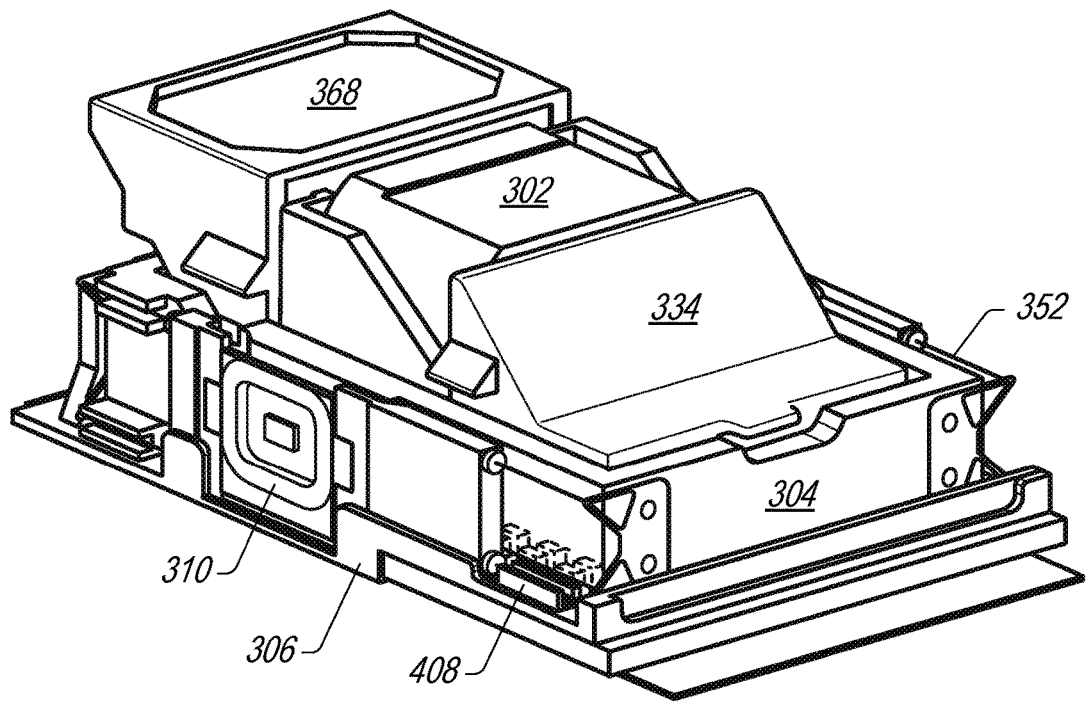
FIGS. 12A-12B illustrate perspective views of a folded optics arrangement camera that includes voice coil motor (VCM) actuators showing locations of coils and magnets of the VCM actuators, according to some embodiments.
Figure 12B:
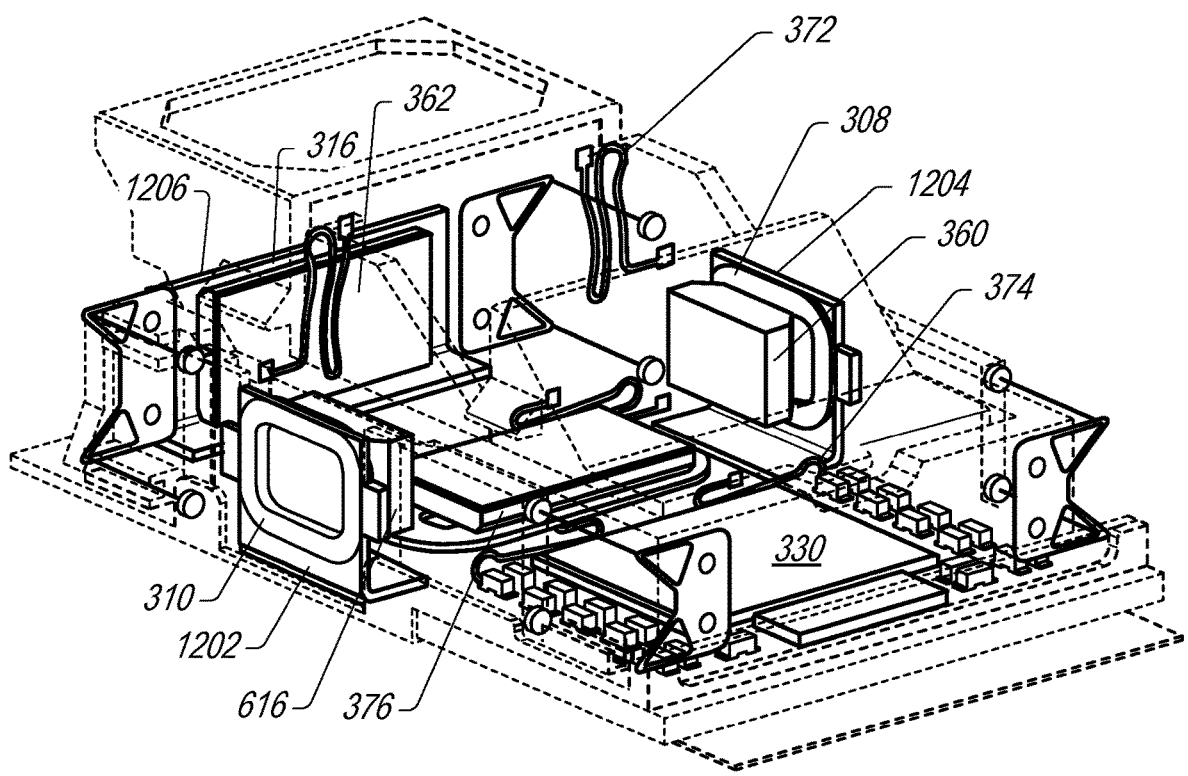

FIGS. 12A-12B illustrate perspective views of a folded optics arrangement camera that includes a voice coil motor (VCM) actuator assembly showing locations of coils and magnets of the VCM actuator assembly, according to some embodiments.

In some embodiments, two single pole magnets 360 and 616 are mounted on either side of a carrier frame 304 and interact with OIS-Y coils 308 and 310, respectively to form a voice coil motor actuator system in the Y-direction. In some embodiments, dual pole magnets 362 are mounted on a third side of a carrier frame 304 and interact with OIS-Z coils 316 to form an additional voice coil motor actuator in the Z direction. In some embodiments, dual pole magnets 376 are mounted on a bottom side of a lens carrier 302 and interact with autofocus coils 320 mounted to static structure 306 (hidden beneath dual pole magnets 376 in FIG. 12B) to form a voice coil motor actuator in the X-direction.

In some embodiments, tabs for the respective coils may be inserted into a static structure 306 or otherwise coupled to a static structure 306 to form a common assembly. For example, tab 1202 comprising OIS-Y coil 310, tab 1204 comprising OIS-Y coil 308, and tab 1206 comprising OIS-Z coil 316 are inserted or otherwise coupled to static structure 306 and are bent up around carrier frame 304.

Figure 13:
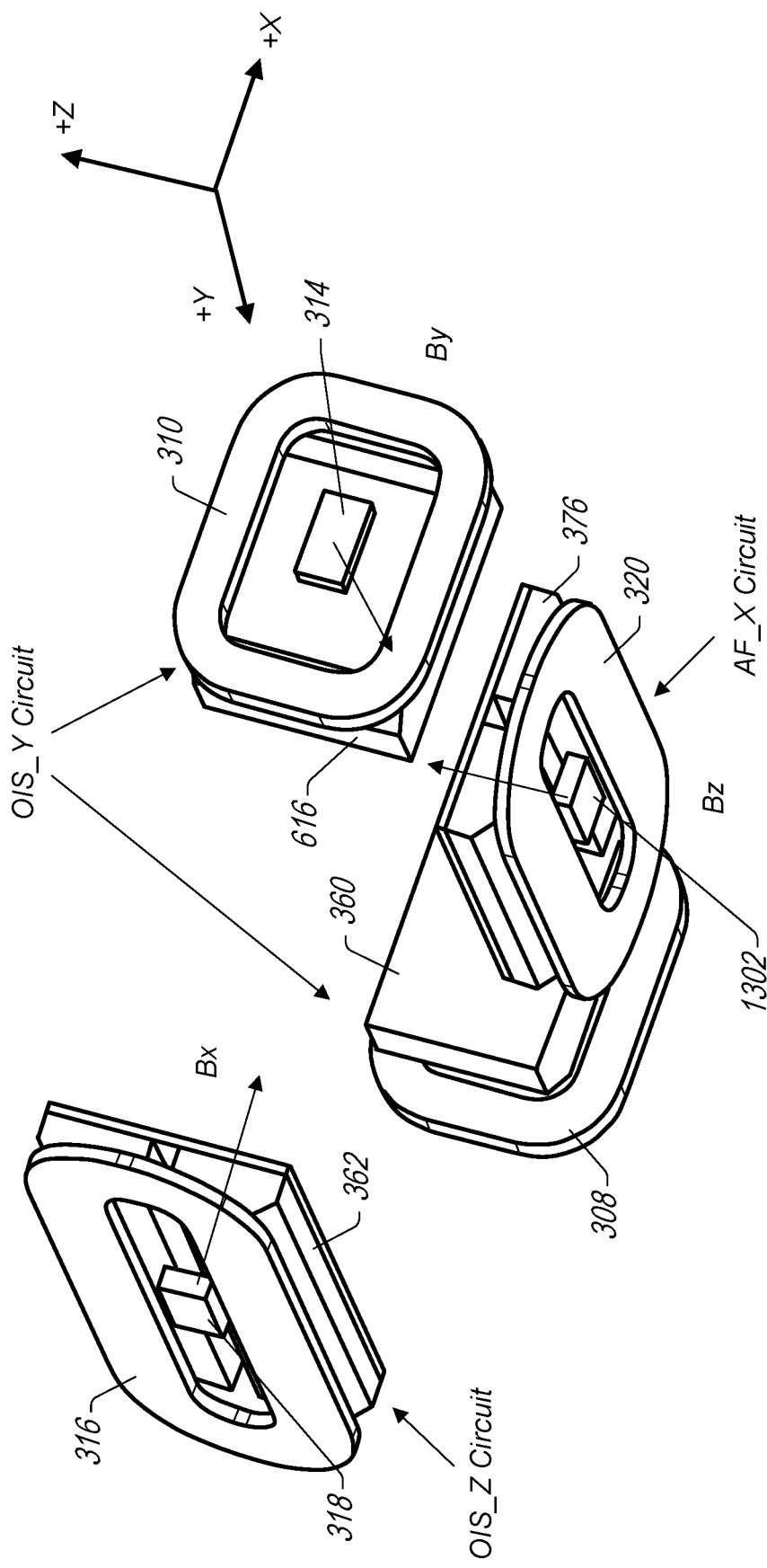
FIG. 13 illustrates a perspective view showing relative locations of magnets, coils, and sensors included in voice coil motor (VCM) actuators of a folded optics arrangement camera, according to some embodiments.

FIG. 13 illustrates a perspective view showing relative locations of magnets, coils, and sensors included in a voice coil motor (VCM) actuator assembly of a folded optics arrangement camera, according to some embodiments.

For example, an OIS-Y circuit may include OIS-Y coils 308 and 310 positioned opposite of one another on a static structure of a folded optics arrangement camera actuator assembly. Also, single pole magnets 360 and 616 may be mounted to a carrier frame and positioned adjacent to the OIS-Y coils 308 and 310. Current flow through the OIS-Y coils may induce a magnetic field that interacts with a magnetic field of the respective single pole magnets 360 and 616 to cause one or more forces to be exerted on a carrier frame, wherein the one or more forces act in the Y-direction. In some embodiments, the OIS-Y coils 308 and 310 and associated magnets 360 and 616 may be positioned such that forces exerted on the carrier frame by the combination of OIS-Y coils and magnets act on a center of mass of the carrier frame.

In some embodiments, an OIS-Z circuit may include an OIS-Z coil 316. Current flowing through the OIS-Z coil may induce a magnetic field that interacts with the dual pole magnet 362 to cause a carrier frame to move upwards or downwards in the Z-direction. In some embodiments, an autofocus circuit may include AF-coils 320 mounted on a base of a static structure. A corresponding dual pole magnet 376 may be mounted on a bottom side of a lens carrier and may be positioned above the AF-coils 320 mounted to the static structure. Current flow through the AF-coils 320 may cause one or more forces to be exerted on the lens carrier in either the positive or negative X-direction such that the AF-coils and associated dual pole magnet form a voice coil motor actuator that causes the position of the lens carrier to be adjusted in the X-direction.

In some embodiments, hall sensor 318 included in OIS-Z coil 316 measures magnetic field Bx, hall sensor 314 included in OIS-Y coil measures magnetic field By, another hall sensor 312 (not shown in FIG. 13) included in OIS-Y coil 308 measures an additional magnetic field By on another side of the carrier frame, and hall sensor 1302 included in AF-coil 320 measures a magnetic field Bz.

In some embodiments, magnetic field measurements from hall sensors 318, 314, 312, and 1302 may be used by an actuator controller to adjust a position of a lens carrier in an X-direction and to adjust a position of a carrier frame (and lens carrier mounted within the carrier frame) in a Y-direction and/or Z-direction.

Figure 14:
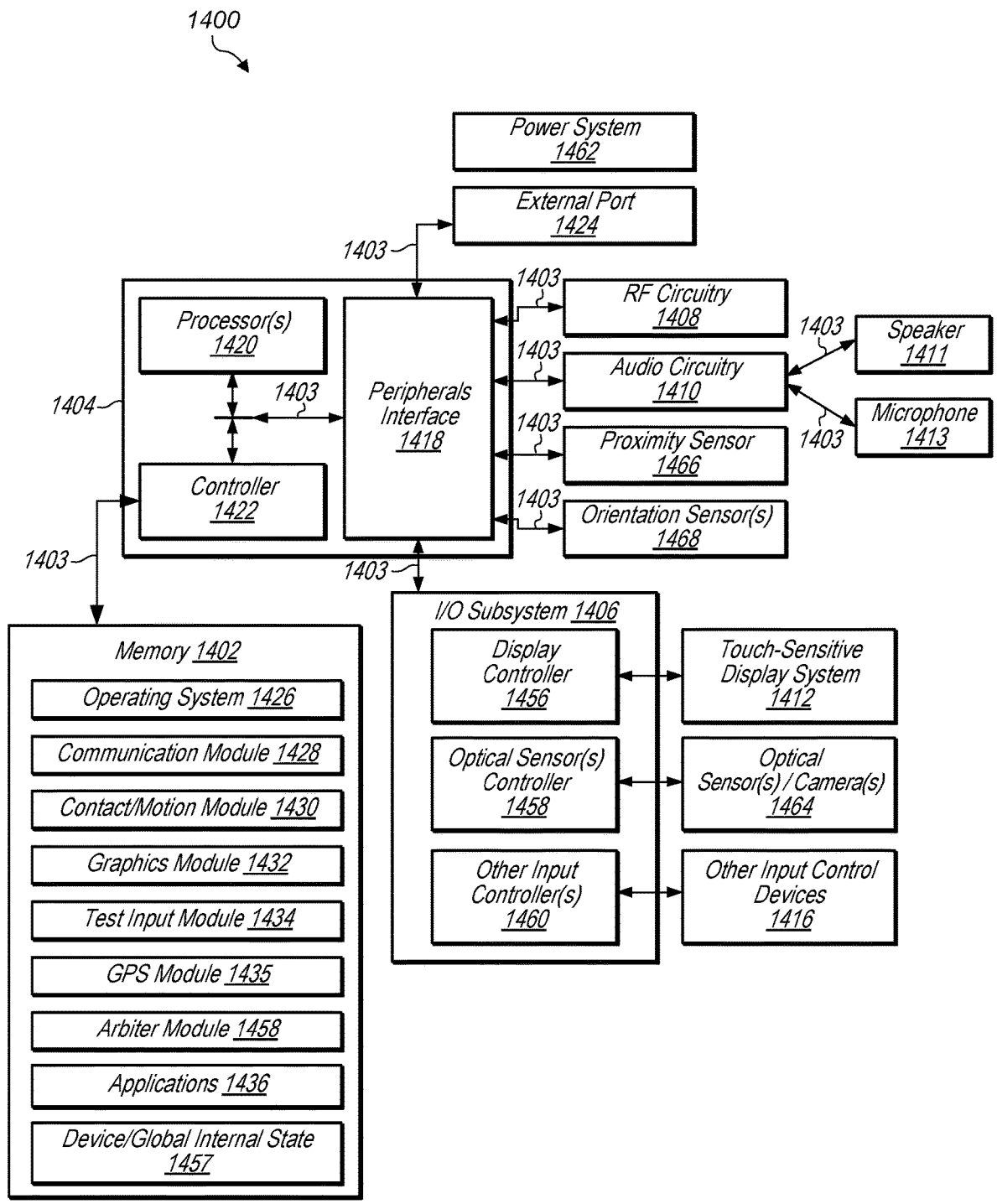
FIG. 14 illustrates a block diagram of an example portable multifunction device that may include a folded optics arrangement camera and voice coil motor actuators with a horizontal suspension wire arrangement, according to some embodiments.

FIG. 14 illustrates a block diagram of an example portable multifunction device 1400 that may include a camera having a folded optics arrangement and actuator assembly as described above, in accordance with some embodiments. In some embodiments, the portable multifunction device 1400 may include one or multiple features, components, and/or functionality of embodiments described herein with reference to FIGS. 1-13, 15, and 16.

Camera(s) 1464 is sometimes called an "optical sensor" for convenience, and may also be known as or called an optical sensor system. In some embodiments, camera 1464 may be a folded optics arrangement camera and actuator system as described herein, such as folded optics arrangement camera 300. Device 1400 may include memory 1402 (which may include one or more computer readable storage mediums), memory controller 1422, one or more processing units (CPUs) 1420, peripherals interface 1418, RF circuitry 1408, audio circuitry 1410, speaker 1411, touch-sensitive display system 1412, microphone 1413, input/output (I/O) subsystem 1406, other input or control devices 1416, and external port 1424. Device 1400 may include one or more optical sensors 1464. These components may communicate over one or more communication buses or signal lines 1403.

It should be appreciated that device 1400 is only one example of a portable multifunction device, and that device 1400 may have more or fewer components than shown, may combine two or more components, or may have a different configuration or arrangement of the components. The various components shown in FIG. 14 may be implemented in hardware, software, or a combination of hardware and software, including one or more signal processing and/or application specific integrated circuits.

Memory 1402 may include high-speed random access memory and may also include non-volatile memory, such as one or more magnetic disk storage devices, flash memory devices, or other non-volatile solid-state memory devices. Access to memory 1402 by other components of device 1400, such as CPU 1420 and the peripherals interface 1418, may be controlled by memory controller 1422.

Peripherals interface 1418 can be used to couple input and output peripherals of the device to CPU 1420 and memory 1402. The one or more processors 1420 run or execute various software programs and/or sets of instructions stored in memory 1402 to perform various functions for device 1400 and to process data.

In some embodiments, peripherals interface 1418, CPU 1420, and memory controller 1422 may be implemented on a single chip, such as chip 1404. In some other embodiments, they may be implemented on separate chips.

RF (radio frequency) circuitry 1408 receives and sends RF signals, also called electromagnetic signals. RF circuitry 1408 converts electrical signals to/from electromagnetic signals and communicates with communications networks and other communications devices via the electromagnetic signals. RF circuitry 1408 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1408 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1410, speaker 1411, and microphone 1413 provide an audio interface between a user and device 1400. Audio circuitry 1410 receives audio data from peripherals interface 1418, converts the audio data to an electrical signal, and transmits the electrical signal to speaker 1411. Speaker 1411 converts the electrical signal to human-audible sound waves. Audio circuitry 1410 also receives electrical signals converted by microphone 1413 from sound waves. Audio circuitry 1410 converts the electrical signal to audio data and transmits the audio data to peripherals interface 1418 for processing. Audio data may be retrieved from and/or transmitted to memory 1402 and/or RF circuitry 1408 by peripherals interface 1418. In some embodiments, audio circuitry 1410 also includes a headset jack (e.g., 1512, FIG. 15). The headset jack provides an interface between audio circuitry 1410 and removable audio input/output peripherals, such as output-only headphones or a headset with both output (e.g., a headphone for one or both ears) and input (e.g., a microphone).

I/O subsystem 1406 couples input/output peripherals on device 1400, such as touch screen 1412 and other input control devices 1416, to peripherals interface 1418. I/O subsystem 1406 may include display controller 1456 and one or more input controllers 1460 for other input or control devices. The one or more input controllers 1460 receive/send electrical signals from/to other input or control devices 1416. The other input control devices 1416 may include physical buttons (e.g., push buttons, rocker buttons, etc.), dials, slider switches, joysticks, click wheels, and so forth. In some alternate embodiments, input controller(s) 1460 may be coupled to any (or none) of the following: a keyboard, infrared port, USB port, and a pointer device such as a mouse. The one or more buttons (e.g., 1508, FIG. 15) may include an up/down button for volume control of speaker 1411 and/or microphone 1413. The one or more buttons may include a push button (e.g., 1506, FIG. 15).

Touch-sensitive display 1412 provides an input interface and an output interface between the device and a user. Display controller 1456 receives and/or sends electrical signals from/to touch screen 1412. Touch screen 1412 displays visual output to the user. The visual output may include graphics, text, icons, video, and any combination thereof (collectively termed "graphics"). In some embodiments, some or all of the visual output may correspond to user-interface objects.

Touch screen 1412 has a touch-sensitive surface, sensor or set of sensors that accepts input from the user based on haptic and/or tactile contact. Touch screen 1412 and display controller 1456 (along with any associated modules and/or sets of instructions in memory 1402) detect contact (and any movement or breaking of the contact) on touch screen 1412 and converts the detected contact into interaction with user-interface objects (e.g., one or more soft keys, icons, web pages or images) that are displayed on touch screen 1412. In an example embodiment, a point of contact between touch screen 1412 and the user corresponds to a finger of the user.

Touch screen 1412 may use LCD (liquid crystal display) technology, LPD (light emitting polymer display) technology, or LED (light emitting diode) technology, although other display technologies may be used in other embodiments. Touch screen 1412 and display controller 1456 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1412. In an example embodiment, projected mutual capacitance sensing technology is used.

Touch screen 1412 may have a video resolution in excess of 800 dpi. In some embodiments, the touch screen has a video resolution of approximately 860 dpi. The user may make contact with touch screen 1412 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1412 or an extension of the touch-sensitive surface formed by the touch screen.

Device 1400 also includes power system 1462 for powering the various components. Power system 1462 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1400 may also include one or more optical sensors or cameras 1464. FIG. 14 shows an optical sensor 1464 coupled to optical sensor controller 1458 in I/O subsystem 1406. Optical sensor 1464 may include charge-coupled device (CCD) or complementary metal-oxide semiconductor (CMOS) phototransistors. Optical sensor 1464 receives light from the environment, projected through one or more lens, and converts the light to data representing an image. In conjunction with imaging module 1443 (also called a camera module), optical sensor 1464 may capture still images or video. In some embodiments, an optical sensor 1464 is located on the back of device 1400, opposite touch screen display 1412 on the front of the device, so that the touch screen display 1412 may be used as a viewfinder for still and/or video image acquisition. In some embodiments, another optical sensor is located on the front of the device so that the user's image may be obtained for videoconferencing while the user views the other video conference participants on the touch screen display.

Device 1400 may also include one or more proximity sensors 1466. FIG. 14 shows proximity sensor 1466 coupled to peripherals interface 1418. Alternately, proximity sensor 1466 may be coupled to input controller 1460 in I/O subsystem 1406. In some embodiments, the proximity sensor 1466 turns off and disables touch screen 1412 when the multifunction device 1400 is placed near the user's ear (e.g., when the user is making a phone call).

Device 1400 includes one or more orientation sensors 1468. In some embodiments, the one or more orientation sensors 1468 include one or more accelerometers (e.g., one or more linear accelerometers and/or one or more rotational accelerometers). In some embodiments, the one or more orientation sensors 1468 include one or more gyroscopes. In some embodiments, the one or more orientation sensors 1468 include one or more magnetometers. In some embodiments, the one or more orientation sensors 1468 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1400. In some embodiments, the one or more orientation sensors 1468 include any combination of orientation/rotation sensors.

FIG. 14 shows the one or more orientation sensors 1468 coupled to peripherals interface 1418. Alternately, the one or more orientation sensors 1468 may be coupled to an input controller 1460 in I/O subsystem 1406. In some embodiments, information is displayed on the touch screen display 1412 in a portrait view or a landscape view based on an analysis of data received from the one or more orientation sensors 1468.

In some embodiments, the software components stored in memory 1402 include operating system 1426, communication module (or set of instructions) 1428, contact/motion module (or set of instructions) 1430, graphics module (or set of instructions) 1432, text input module (or set of instructions) 1434, Global Positioning System (GPS) module (or set of instructions) 1435, arbiter module 1458 and applications (or sets of instructions) 1436. Furthermore, in some embodiments memory 1402 stores device/global internal state 1457. Device/global internal state 1457 includes one or more of: active application state, indicating which applications, if any, are currently active; display state, indicating what applications, views or other information occupy various regions of touch screen display 1412; sensor state, including information obtained from the device's various sensors and input control devices 1416; and location information concerning the device's location and/or attitude.

Operating system 1426 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1428 facilitates communication with other devices over one or more external ports 1424 and also includes various software components for handling data received by RF circuitry 1408 and/or external port 1424. External port 1424 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1430 may detect contact with touch screen 1412 (in conjunction with display controller 1456) and other touch sensitive devices (e.g., a touchpad or physical click wheel). In some embodiments, contact/motion module 1430 and display controller 1456 detect contact on a touchpad. Contact/motion module 1430 may detect a gesture input by a user. Different gestures on the touch-sensitive surface have different contact patterns. Graphics module 1432 includes various known software components for rendering and displaying graphics on touch screen 1412 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 1434, which may be a component of graphics module 1432, provides soft keyboards for entering text in various applications (e.g., contacts, e-mail, and any other application that needs text input). GPS module 1435 determines the location of the device and provides this information for use in various applications 1436 (e.g., to a camera application as picture/video metadata).

Applications 1436 may include one or more modules (e.g., a contacts module, an email client module, a camera module for still and/or video images, etc.) Examples of other applications 1436 that may be stored in memory 1402 include other word processing applications, other image editing applications, drawing applications, presentation applications, JAVA-enabled applications, encryption, digital rights management, voice recognition, and voice replication. Each of the modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1402 may store a subset of the modules and data structures identified above. Furthermore, memory 1402 may store additional modules and data structures not described above.

Figure 15:
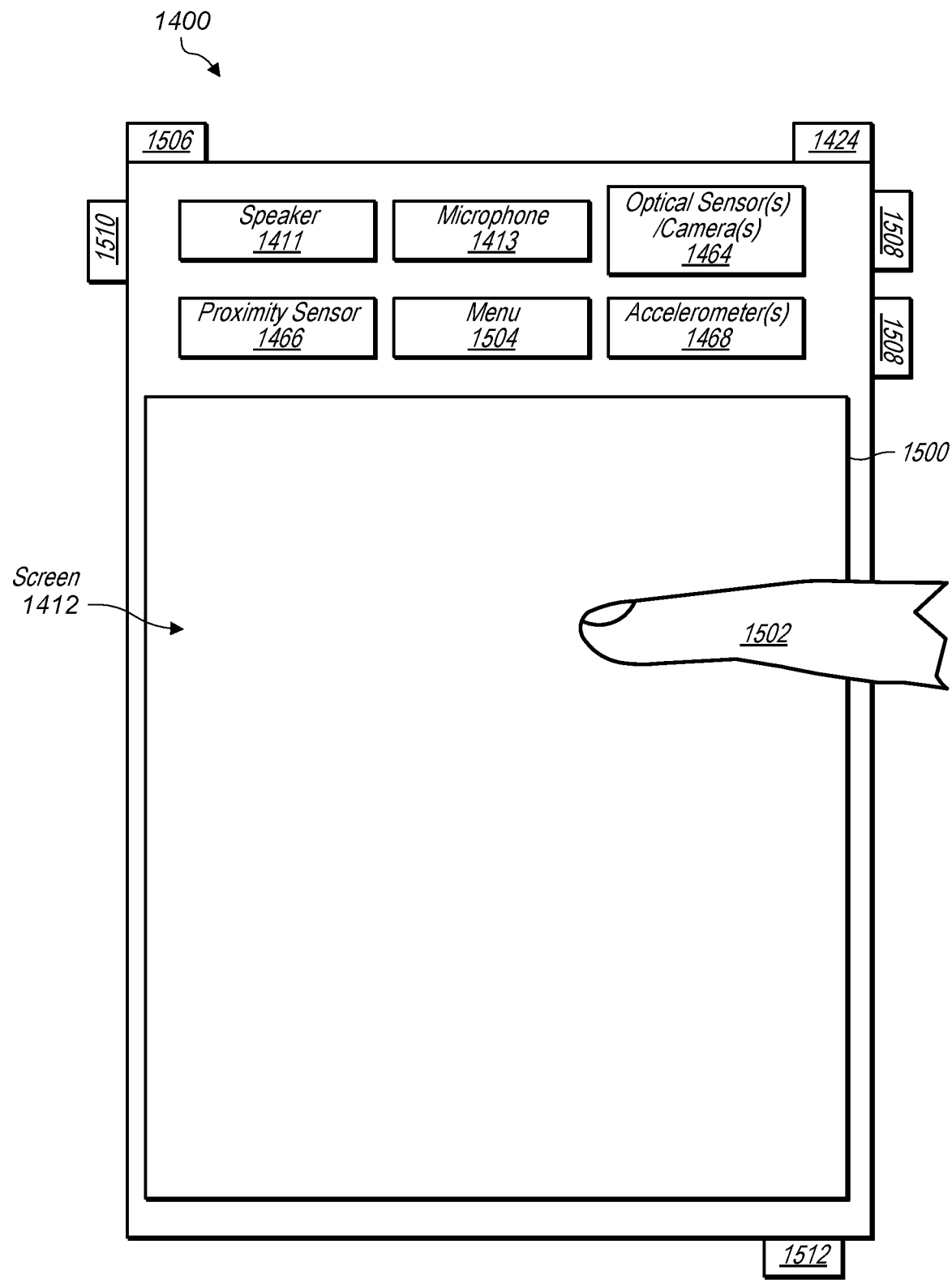
FIG. 15 depicts an example portable multifunction device that may include a folded optics arrangement camera and voice coil motor actuators with a horizontal suspension wire arrangement, according to some embodiments.

FIG. 15 depicts an example portable multifunction device 1400 that may include a camera with a folded optics arrangement, in accordance with some embodiments. In some embodiments, the portable multifunction device 1400 may include one or multiple features, components, and/or functionality of embodiments described herein with reference to FIGS. 1-13 and 16.

The device 1400 may have a touch screen 1412. The touch screen 1412 may display one or more graphics within user interface (UI) 1500. In this embodiment, as well as others described below, a user may select one or more of the graphics by making a gesture on the graphics, for example, with one or more fingers 1502 (not drawn to scale in the figure) or one or more styluses 1503 (not shown in FIG. 15).

Device 1400 may also include one or more physical buttons, such as "home" or menu button 1504. As described previously, menu button 1504 may be used to navigate to any application 1436 in a set of applications that may be executed on device 1400. Alternatively, in some embodiments, the menu button 1504 is implemented as a soft key in a GUI displayed on touch screen 1412.

In one embodiment, device 1400 includes touch screen 1412, menu button 1504, push button 1506 for powering the device on/off and locking the device, volume adjustment button(s) 1508, Subscriber Identity Module (SIM) card slot 1510, head set jack 1512, and docking/charging external port 1424. Push button 1506 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1400 also may accept verbal input for activation or deactivation of some functions through microphone 1413.

It should be noted that, although many of the examples herein are given with reference to optical sensor(s)/camera(s) 1464 (on the front of a device), one or more rear-facing cameras or optical sensors that are pointed opposite from the display may be used instead of, or in addition to, an optical sensor(s)/camera(s) 1464 on the front of a device.

Figure 16:
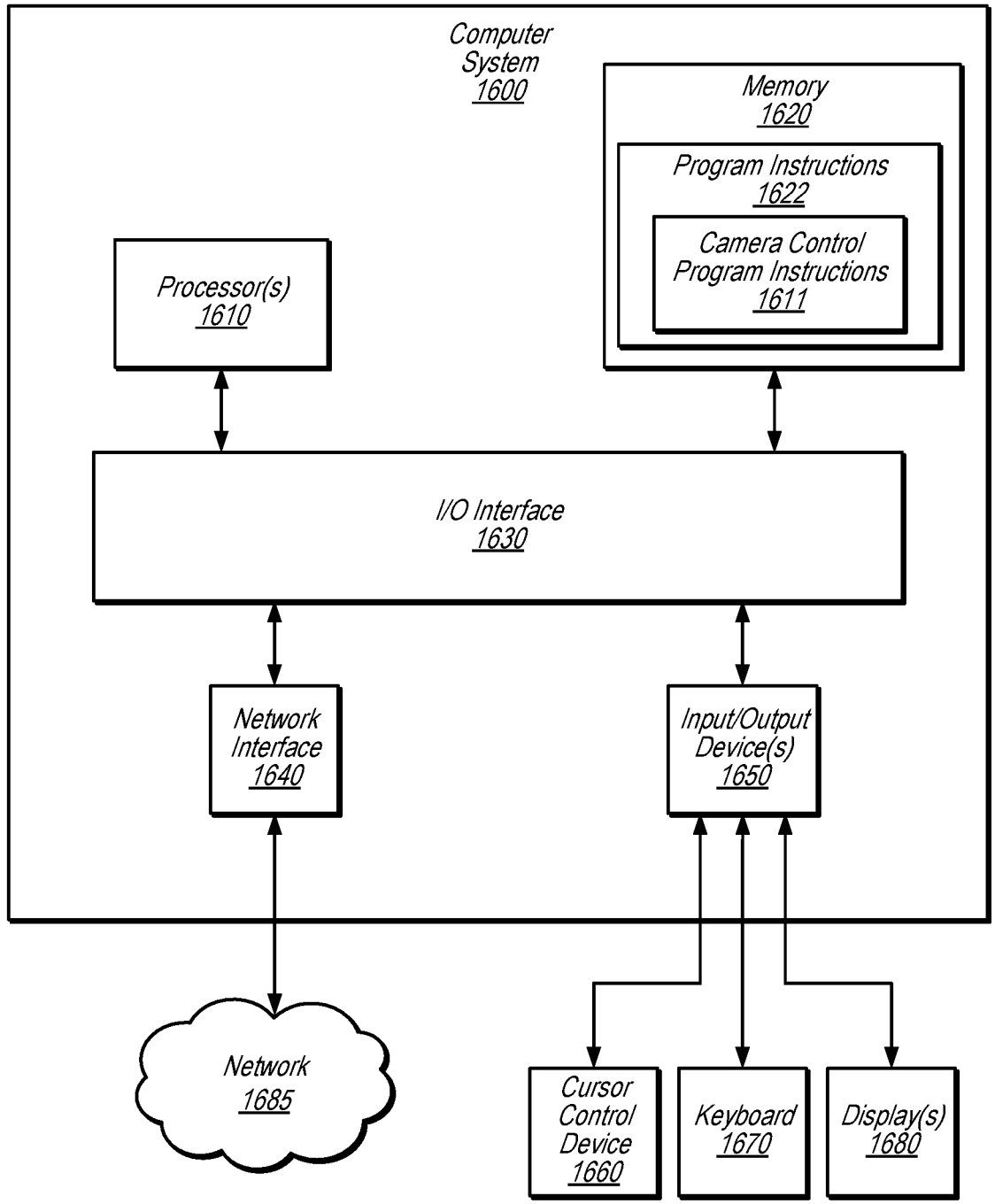
FIG. 16 illustrates an example computer system that may include a folded optics arrangement camera and voice coil motor actuators with a horizontal suspension wire arrangement, according to some embodiments.

FIG. 16 illustrates an example computer system 1600 that may include a camera with a folded optics arrangement, in accordance with some embodiments. In some embodiments, the computer system 1600 may include one or multiple features, components, and/or functionality of embodiments described herein with reference to FIGS. 1-15.

The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1600, which may interact with various other devices. Note that any component, action, or functionality described above with respect to FIGS. 1-15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store camera control program instructions 1622 and/or camera control data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions 1622 may be configured to implement a lens control application 1624 incorporating any of the functionality described above. Additionally, existing camera control data 1632 of memory 1620 may include any of the information or data structures described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   an aperture configured to enable light to enter the camera in a first direction via the aperture;
   a prism configured to redirect the light such that the light is directed in a second direction;
   a lens carrier comprising one or more lens, wherein the lens carrier is oriented in the camera such that the light directed in the second direction passes through the one or more lens of the lens carrier, wherein the one or more lens of the lens carrier define an optical axis of the camera;

an image sensor configured to capture the light which has passed through the one or more lens and convert the light into image signals;

a carrier frame at least partially surrounding the lens carrier and at least partially surrounding the prism on at least two sides of the prism;

a first set of suspension elements configured to mechanically connect the lens carrier to the carrier frame, wherein the suspension elements permit motion of the lens carrier relative to the carrier frame along the optical axis and restrict motion of the lens carrier relative to the carrier frame in directions orthogonal to the optical axis;

a second set of suspension elements configured to mechanically connect the carrier frame to a static member of the camera, configured to be static relative to the carrier frame, wherein the second set of suspension elements are arranged in an opposing arrangement in an optical axis direction that restricts motion of the carrier frame along the optical axis and permits motion of the carrier frame in directions orthogonal to the optical axis; and one or more VCM actuators configured to:
 move the lens carrier, relative to the image sensor, along the optical axis in the carrier frame; and
 move the carrier frame and lens carrier, relative to the image sensor, in a plurality of directions orthogonal to the optical axis.

2. The camera of claim 1, further comprising:
an additional prism, configured to redirect the light that has passed through the one or more lens such that the light is directed into a third direction,
wherein the image sensor is positioned in the camera such that the light directed into the third direction is directed toward the image sensor,
wherein the image sensor is coupled to the static member of the camera or another static member of the camera.

3. The camera of claim 1, wherein a first rotational normal mode of free vibration of the carrier frame comprises rotation about the optical axis such that the one or more lens of the lens carrier rotate about the optical axis.

4. The camera of claim 1, wherein the second set of suspension elements configured to mechanically connect the carrier frame to the static member of the camera comprise:
 suspension wires mechanically connecting the carrier frame to the static member of the camera,
wherein the camera further comprises:
 channels at least partially filled with a gel material, wherein the suspension wires pass through the gel material, and wherein the gel material provides mechanical damping to an assembly comprising the carrier frame and the lens carrier.

5. The camera of claim 4, wherein the static member of the camera comprises a static structure comprising a plurality of static bases positioned between a first end and a second end of the static structure, wherein the carrier frame is mounted in the static structure, and wherein:
 a first group of the suspension wires comprises wires running along a first side of the carrier frame between a first end of the carrier frame and one of the static bases on a side of the static structure adjacent to the first side of the carrier frame;

a second group of the suspension wires comprises wires running along a second side of the carrier frame between the first end of the carrier frame and another one of the static bases on a side of the static structure adjacent to the second side of the carrier frame;

a third group of the suspension wires comprises wires running along the first side of the carrier frame between a second end of the carrier frame and an additional one of the static bases on a side of the static structure adjacent to the first side of the carrier frame; and a fourth group of the suspension wires comprises wires running along the second side of the carrier frame between the second end of the carrier frame and another additional one of the static bases on a side of the static structure adjacent to the second side of the carrier frame.

6. The camera of claim 1, wherein the second set of suspension elements are coupled to the static member of the camera.

7. The camera of claim 6, wherein the static member includes openings, wherein, during assembly, tabs of a common assembly are bent around the carrier frame to position at least a portion of the second set of suspension elements into place in the static member.

8. A voice coil motor (VCM) actuator assembly for a folded optics camera, the VCM actuator assembly comprising:
 a plurality of magnets;
 a plurality of coils;
 a carrier frame configured to at least partially surround a lens carrier and at least partially surrounding a prism on at least two sides of the prism, wherein an optical axis of one or more lens of the lens carrier is oriented perpendicular to a light direction of light entering the folded optics camera;
 a first set of suspension elements configured to mechanically connect the lens carrier to the carrier frame, wherein the suspension elements permit motion of the lens carrier relative to the carrier frame along the optical axis and restrict motion of the lens carrier relative to the carrier frame in directions orthogonal to the optical axis;
 a second set of suspension elements configured to mechanically connect the carrier frame to a static member of the folded optics camera, wherein the second set of suspension elements are arranged in an opposing arrangement in an optical axis direction that restricts motion of the carrier frame along the optical axis and permits motion of the carrier frame in directions orthogonal to the optical axis,
wherein the VCM actuator assembly is configured to:
 move the lens carrier in the carrier frame along the optical axis, relative to an image sensor of the folded optics camera; and
 move the carrier frame and lens carrier in a plurality of directions orthogonal to the optical axis relative to the image sensor.

9. The VCM actuator assembly of claim 8, wherein a first rotational normal mode of free vibration of the VCM actuator assembly comprises rotation about the optical axis such that the rotational motion in the first rotational normal mode of free vibration is optically invisible from a perspective of the image sensor.

10. The VCM actuator assembly of claim 8, wherein the second set of suspension elements configured to mechanically connect the carrier frame to a static member of the folded-optics camera comprises suspension wires mechanically connecting the carrier frame to one or more static members of the folded-optics camera.

11. The VCM actuator assembly of claim 10, wherein the first set of suspension elements comprises at least two wires running from a first corner of the carrier frame to a static base of the one or more static members and at least two additional wires running from a second corner of the carrier frame to another static base of the one or more static members, and
    wherein the second set of suspension elements comprises at least two wires running from a third corner of the carrier frame to an additional static base of the one or more static members and at least two additional wires running from a fourth corner of the carrier frame to another additional static base of the one or more static members.

12. The VCM actuator assembly of claim 10, wherein the VCM actuator assembly further comprises:
    channels at least partially filled with a viscous material, wherein the suspension wires pass through the viscous material of the channels, and wherein the viscous material provides mechanical damping to the VCM actuator assembly.

13. The VCM actuator assembly of claim 8, wherein the magnets are mounted to the carrier frame or the lens carrier and move with the carrier frame or lens carrier.

14. The VCM actuator assembly of claim 13, wherein one or more ferromagnetic pads are coupled to one or more of the magnets, wherein the one or more ferromagnetic pads direct respective magnetic fields of the one or more magnets towards a respective one of the coils and away from an interior of the carrier frame.

15. A mobile multifunction device, comprising:
    a camera module comprising:
        an aperture configured to enable light to enter the camera module in a first direction via the aperture;
        a prism configured to redirect the light such that the light is directed in a second direction;
        a lens carrier comprising one or more lens, wherein the lens carrier is oriented in the camera module such that the light directed in the second direction passes through the one or more lens, wherein the one or more lens of the lens carrier define an optical axis of the camera module;
        an image sensor configured to capture light which has passed through the one or more lens of the lens carrier and convert the light into image signals; and
        a voice coil motor (VCM) actuator assembly comprising:
            a plurality of magnets;
            a plurality of coils;
            a carrier frame at least partially surrounding the lens carrier and at least partially surrounding the prism on at least two sides of the prism;
            a first set of suspension elements configured to mechanically connect the lens carrier to the carrier frame, wherein the suspension elements permit motion of the lens carrier relative to the carrier frame along the optical axis and restrict motion of the lens carrier relative to the carrier frame in directions orthogonal to the optical axis;
            a second set of suspension elements configured to mechanically connect the carrier frame to a static member of the camera module configured to be static relative to the carrier frame, wherein the second set of suspension elements are arranged in an opposing arrangement in an optical axis direction that restricts motion of the carrier frame along the optical axis and permits motion of the carrier frame in directions orthogonal to the optical axis;
    a display; and
    one or more processors configured to:
        cause the VCM actuator assembly to move the lens carrier in the carrier frame, relative to the image sensor, along the optical axis; and
        cause the VCM actuator assembly to move the carrier frame and lens carrier, relative to the image sensor, in a plurality of directions orthogonal to the optical axis.

16. The mobile device of claim 15, wherein a first rotational normal mode of free vibration of the VCM actuator assembly comprises rotation about the optical axis such that the one or more lens of the lens carrier rotate about the optical axis such that the rotational motion in the first rotational normal mode of free vibration is optically invisible from a perspective of the image sensor.

17. The mobile device of claim 15, wherein a casing of the mobile device comprises a turret extending out a distance from a surface of the mobile device, wherein the aperture is located within the turret and at least a portion of the VCM actuator assembly is positioned within the case under a shoulder of the turret.

18. The mobile device of claim 17 wherein the second set of suspension elements comprise suspension wires oriented perpendicular to a direction in which the turret extends out the distance from the surface of the mobile device.

19. The mobile device of claim 17, wherein the first set of suspension elements comprises a first group of suspension springs mounted on a side of the lens carrier opposite the turret and another group of suspension springs mounted on a side of the lens carrier closer to the turret, wherein the first group of suspension springs comprises more suspension springs than the other group of suspension springs mounted closer to the turret.

20. The mobile device of claim 19, wherein the respective stiffnesses of the first group of suspension springs and the second group of suspension springs are different stiffnesses, wherein the stiffnesses of the respective groups of suspension springs are selected such that the first rotational normal mode of free vibration of the VCM actuator assembly comprises rotation about the optical axis such that the one or more lens of the lens carrier rotate about the optical axis without being displaced relative to the image sensor.

\* \* \* \* \*